US010225480B2

United States Patent
Itoh et al.

(10) Patent No.: US 10,225,480 B2
(45) Date of Patent: Mar. 5, 2019

(54) TERMINAL DEVICE, METHOD FOR ACQUIRING DRAWING TARGET, AND COMPUTER-READABLE RECORDING MEDIUM

(71) Applicants: Atsushi Itoh, Kanagawa (JP); Aiko Ohtsuka, Kanagawa (JP); Munetake Moroyama, Tokyo (JP)

(72) Inventors: Atsushi Itoh, Kanagawa (JP); Aiko Ohtsuka, Kanagawa (JP); Munetake Moroyama, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/710,778

(22) Filed: May 13, 2015

(65) Prior Publication Data

US 2015/0334280 A1 Nov. 19, 2015

(30) Foreign Application Priority Data

May 16, 2014 (JP) .................. 2014-102745

(51) Int. Cl.
| | |
|---|---|
| G06K 9/00 | (2006.01) |
| G06K 9/20 | (2006.01) |
| G06K 9/32 | (2006.01) |
| G06T 1/00 | (2006.01) |
| H04N 1/00 | (2006.01) |
| H04N 5/225 | (2006.01) |

(Continued)

(52) U.S. Cl.
CPC ....... H04N 5/2351 (2013.01); G06K 9/00463 (2013.01); G06K 9/2063 (2013.01);
(Continued)

(58) Field of Classification Search
CPC .... H04N 5/2351; H04N 5/2354; H04N 5/235; H04N 5/225; H04N 5/2257;
(Continued)

(56) References Cited

U.S. PATENT DOCUMENTS

| | | |
|---|---|---|
| 7,212,239 B2 | 5/2007 | Sakaguchi |
| 2003/0044066 A1 | 3/2003 | Sakaguchi |

(Continued)

FOREIGN PATENT DOCUMENTS

| | | |
|---|---|---|
| JP | H06121214 A | 4/1994 |
| JP | 200387653 A | 3/2003 |

(Continued)

OTHER PUBLICATIONS

Office Action for Japanese Application No. 2014-102745 dated Feb. 20, 2018 (English translation not available).

*Primary Examiner* — Twyler L Haskins
*Assistant Examiner* — Quan Pham
(74) *Attorney, Agent, or Firm* — Harness, Dickey & Pierce, P.L.C.

(57) ABSTRACT

A terminal device, comprising: a capturing unit capturing a subject; a light emitting unit; a display unit, a processor, and a storage unit containing a program that causes the processor to execute a process of acquiring a drawing target drawn by a user from a captured image of the subject including the drawing target and causing the drawing target to be displayed on a screen of the display unit, the program causes the processor to execute; controlling the light emitting unit to emit the light when the capturing unit captures the subject according to the user's operation, acquiring the captured image that is obtained by capturing the subject irradiated with the light emitted from the light emitting unit, performing image correction corresponding to a brightness distribution of the light emitted from the light emitting unit on the captured image, and extracting the drawing target from the captured image acquired.

15 Claims, 23 Drawing Sheets

(51) Int. Cl.
 *H04N 5/232* (2006.01)
 *H04N 5/235* (2006.01)
(52) U.S. Cl.
 CPC .......... *G06K 9/3216* (2013.01); *G06T 1/0007* (2013.01); *H04N 1/0044* (2013.01); *H04N 1/00183* (2013.01); *H04N 5/2257* (2013.01); *H04N 5/2354* (2013.01); *H04N 5/23222* (2013.01); *G06K 9/2027* (2013.01); *G06K 2009/3225* (2013.01)
(58) Field of Classification Search
 CPC .... H04N 5/23254; H04N 1/00; H04N 1/0044; H04N 1/00183; H04N 5/23222; G06T 1/0007; G06K 9/00463; G06K 9/2027; G06K 9/2063; G06K 9/3216; G06K 2009/3225
 See application file for complete search history.

(56) References Cited

U.S. PATENT DOCUMENTS

| | | | | |
|---|---|---|---|---|
| 2007/0262235 | A1* | 11/2007 | Pertsel | H04N 5/2354 250/208.1 |
| 2007/0269124 | A1* | 11/2007 | Li | G06K 9/38 382/254 |
| 2012/0308159 | A1 | 12/2012 | Otsuka et al. | |
| 2013/0124414 | A1* | 5/2013 | Roach | G06Q 20/10 705/44 |
| 2013/0155474 | A1* | 6/2013 | Roach | G06Q 20/322 358/505 |
| 2013/0176465 | A1* | 7/2013 | Sumisaki | H04N 5/2354 348/241 |
| 2014/0037183 | A1* | 2/2014 | Gorski | G06K 9/00449 382/138 |
| 2014/0108456 | A1* | 4/2014 | Ramachandrula | G06K 9/00449 707/779 |
| 2014/0333612 | A1 | 11/2014 | Itoh et al. | |
| 2015/0135137 | A1* | 5/2015 | Miwa | G06T 11/60 715/808 |

FOREIGN PATENT DOCUMENTS

| | | |
|---|---|---|
| JP | 2009-131596 | 6/2009 |
| JP | 2012-249172 | 12/2012 |
| JP | 2013165318 A | 8/2013 |
| JP | 2013205675 A | 10/2013 |
| JP | 2014-128692 | 7/2014 |
| JP | 2014-238811 | 12/2014 |

* cited by examiner

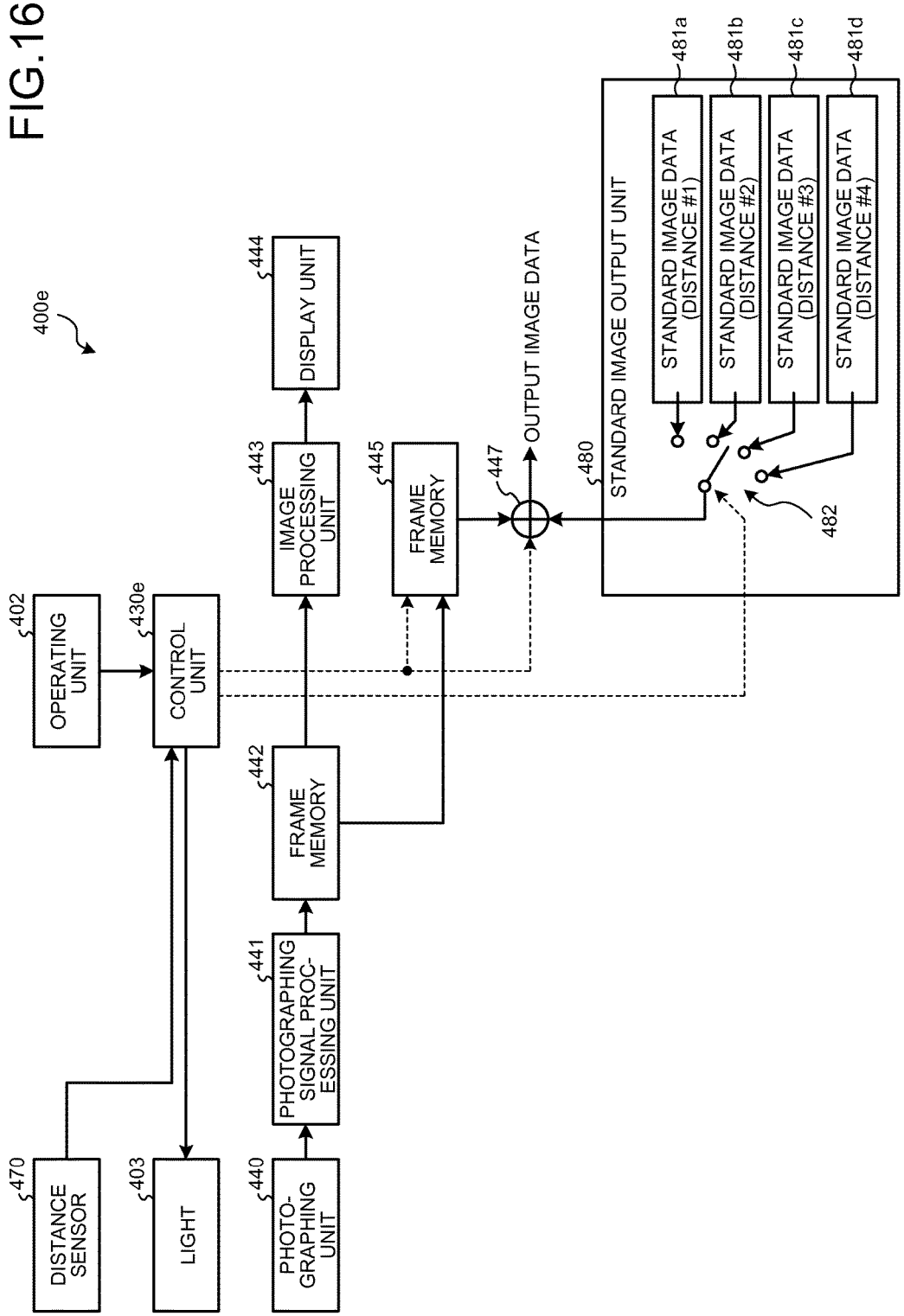

TERMINAL DEVICE, METHOD FOR ACQUIRING DRAWING TARGET, AND COMPUTER-READABLE RECORDING MEDIUM

CROSS-REFERENCE TO RELATED APPLICATIONS

The present application claims priority to and incorporates by reference the entire contents of Japanese Patent Application No. 2014-102745 filed in Japan on May 16, 2014.

BACKGROUND OF THE INVENTION

1. Field of the Invention

The present invention relates to a terminal device, a method for acquiring drawing target, and computer-readable recording medium containing a computer program.

2. Description of the Related Art

In the past, a technique of converting an image obtained by a user drawing a desired character on a sheet or the like into digital data, combining the digital data with another image data, and displaying combined data has been known. Japanese Laid-open Patent Publication No. 2009-131596 discloses a system in which it is possible to enjoy a race in a pseudo manner using characters drawn by respective users.

For example, a scanner device scans an original obtained by the user drawing a character, and a computer connected to the scanner device extracts a character region from original image data obtained by scanning the original. The computer applies the image data in which the character region is extracted to a coordinate space by a computer.

For example, the computer binarizes original image data through threshold determination based on brightness values of pixels, and determines a drawing region and a non-drawing region on the binarized original image data in units of pixels. Then, the computer uses the region determined to be the drawing region as the character region.

Meanwhile, in the recent years, with the spread of multi-function mobile terminals such as smartphones or tablet-type computers, the performance of a digital camera mounted in the multi-function mobile terminal has been improved as well. If original image data is acquired by capturing an image of an original obtained by the user drawing a character through the digital camera mounted in the multi-function mobile terminal, the process of extracting the character region from the original image can be implemented without using the scanner device.

Meanwhile, original image data obtained by capturing an original image through a digital camera may be low in overall brightness or may have non-uniform brightness within an original plane due to a shadow or the like. In this case, it may be difficult to extract the drawing region properly although the binarization process is performed on the captured original image data.

In order to solve low brightness or non-uniform brightness in a captured image of an original image, a method of turning on a light installed in the multi-function mobile terminal is considered. When the light is turned on, influence of ambient light is reduced, and the occurrence of a shadow is suppressed. Further, as the light is turned on, low brightness can be expected to be solved. However, since the light mounted in the multi-function mobile terminal is commonly a point light source, an image captured in a state in which the light is turned on is bright in front of the light, that is, near a center of an original but dark in a peripheral portion, and thus an image is likely to have non-uniform brightness. In this case, there is a problem in that it may be difficult to properly extract the drawing region from the captured image data.

In view of the above-mentioned conventional problems, there is a need to make it possible to easily extract a drawing region from a captured image obtained by capturing an original.

SUMMARY OF THE INVENTION

It is an object of the present invention to at least partially solve the problems in the conventional technology.

According to the present invention, there is provided a terminal device, comprising: a capturing unit that captures a subject; a light emitting unit that emits light; a display unit, a processor, and a storage unit that contain a program that causes the processor to execute a process of acquiring a drawing target drawn by a user from a captured image of the subject including the drawing target and causing the drawing target to be displayed on a screen of the display unit, the program causes the processor to execute; controlling the light emitting unit to emit the light when the capturing unit captures the subject according to the user's operation, acquiring the captured image that is obtained by capturing the subject irradiated with the light emitted from the light emitting unit, performing image correction corresponding to a brightness distribution of the light emitted from the light emitting unit on the captured image, and extracting the drawing target from the captured image acquired.

The present invention also provides a method for acquiring drawing target performed by a terminal device that includes a capturing unit that captures a subject, a light emitting unit that emits light, a display unit, a processor, and a storage unit that contain a program that causes the processor to execute a process of acquiring a drawing target drawn by a user from a captured image of the subject including the drawing target and causing the drawing target to be displayed on a screen of the display unit, the method comprising; controlling the light emitting unit to emit the light when the capturing unit captures the subject according to the user's operation, acquiring the captured image that is obtained by capturing the subject irradiated with the light emitted from the light emitting unit, performing image correction corresponding to a brightness distribution of the light emitted from the light emitting unit on the captured image, and extracting the drawing target from the captured image acquired.

The present invention also provides a non-transitory computer-readable recording medium that contains a computer program that is installed in a terminal device that includes a capturing unit that captures a subject, a light emitting unit that emits light, a display unit, a processor, and a storage unit that contain a program that causes the processor to execute a process of acquiring a drawing target drawn by a user from a captured image of the subject including the drawing target and causing the drawing target to be displayed on a screen of the display unit, the program causes the processor to execute; controlling the light emitting unit to emit the light when the capturing unit captures the subject according to the user's operation, acquiring the captured image that is obtained by capturing the subject irradiated with the light emitted from the light emitting unit, performing image correction corresponding to a brightness distribution of the light emitted from the light emitting unit on the captured image, and extracting the drawing target from the captured image acquired.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 16 is a block diagram illustrating an exemplary configuration of an information processing device according to a second embodiment;

DETAILED DESCRIPTION OF THE PREFERRED EMBODIMENTS

Figure 1A:
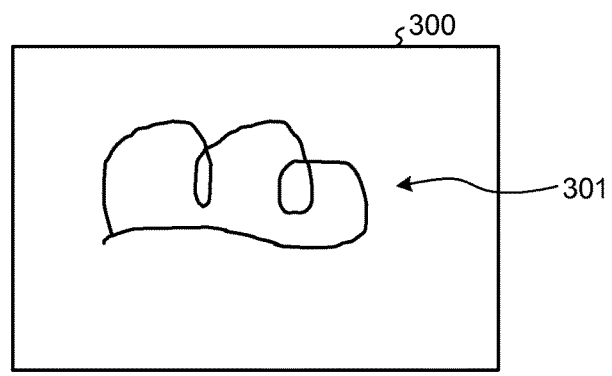
FIGS. 1A to 1C are diagrams for conceptually describing a first embodiment.

Hereinafter, embodiments of a terminal device, a method for acquiring a drawing target, and a computer-readable recording medium containing a computer program will be described in detail with reference to the appended drawings.

First Embodiment

A first embodiment will be described. For example, a first embodiment relates to image processing that is performed on a captured image in order to easily perform a process of extracting an image (referred to as a "user image") that is drawn by the user and included in a captured image obtained by capturing a sheet having an image drawn by the user through an imaging device. The user image means a drawing target that drawn by a user. Thus, the drawing target includes illustrations and pictures where not only animals, plants, game characters, but also writing characters are freely drawn and written by a user.

Overview of First Embodiment

The first embodiment will be conceptually described with reference to FIGS. 1A to 1G. For example, the user draws an arbitrary user image 301 on a sheet 300 as illustrated in FIG. 1A. In order to convert the user image 301 into image data, the sheet 300 including the user image 301 is captured using a digital camera. Image processing is performed on a captured image obtained by capturing the sheet 300, and a region of the user image 301 is extracted. For example, the user image 301 indicates a line drawn by the user, and the region of the user image 301 indicates a region including the entire user image 301.

At this time, for example, a process of performing threshold determination on pixel values (brightness values) of pixels of the captured image, binarizing the captured image, and deciding the region of the user image 301 based on the binarized pixels can be applied as the image processing. For example, binarization of setting a pixel having a pixel value equal to or larger than a threshold to a value "1" and setting a pixel having a pixel value less than a threshold to a value "0" is performed, and pixels of the value "0" are decided to be pixels by the user image 301. Further, the region of the user image 301 extracted based on the pixels of the value "0."

When the binarization process is performed on the captured image, if there is a shadow on the sheet 300, a shadow portion is extracted as the value "0" through the threshold determination, and thus it is likely to be difficult to extract the user image 301 properly. Further, this is the same even when lighting is insufficient, and overall brightness of a captured image is low. Thus, it is desirable to irradiate a subject with light or the like and suppress influence of a shadow or low brightness at the time of capturing.

Here, a camera (hereinafter, referred to as an "internal camera") embedded in a multi-function mobile terminal (user's terminal device) such as a smartphone or a tablet-type computer is assumed to be used as a digital camera. A light embedded in the multi-function mobile terminal is commonly regarded to be a point light source. Thus, when the sheet 300 is irradiated with the light (hereinafter, referred to as an "internal light") embedded in the multi-function mobile terminal, a brightness distribution in which brightness is highest in front of the light, that is, near the center of the sheet 300, and brightness gradually decreases from the center to the periphery thereof is formed.

Figure 1B:
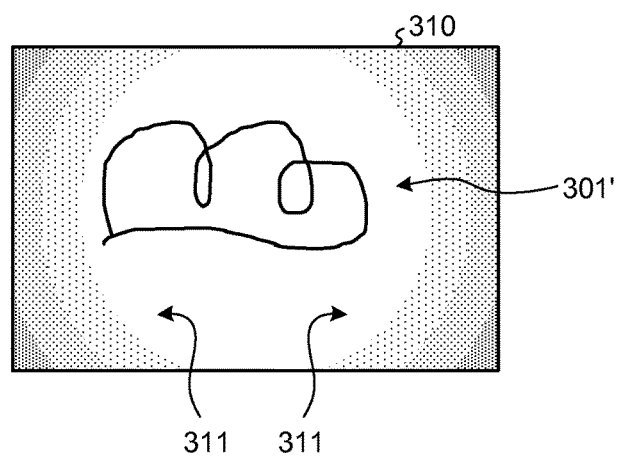

FIG. 1B illustrates an exemplary captured image obtained by irradiating the sheet 300 with the light embedded in the multi-function mobile terminal and capturing the sheet 300. Referring to FIG. 1B, a captured image 310 has a brightness distribution in which brightness gradually decreases toward the periphery as indicated by a gradation 311, corresponding to a brightness distribution of the sheet 300. If the binarization process is performed on the captured image 310 having this brightness distribution, particularly, a peripheral region having low brightness is likely to be extracted as the user image together with a user image 301'. In this case, it is difficult to extract a region of the user image 301' properly from the captured image 310.

In this regard, in the first embodiment, an image having a brightness distribution when a subject is irradiated with light is prepared as a standard image in advance, and a captured image captured by irradiating with light is corrected using the standard image.

Figure 1C:
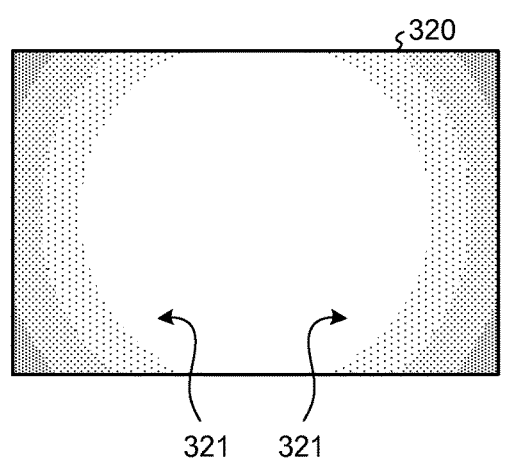

FIG. 1C illustrates an exemplary standard image. Referring to FIG. 1C, a standard image 320 has a brightness distribution in which brightness has a highest value near the center, and brightness gradually decreases from the center toward the periphery as indicated by a gradation 321. For example, a brightness change in the standard image is identical to a brightness change in the captured image. In other words, the standard image 320 is an image having a brightness distribution of a plane by a light at a distance given as a distance of the sheet 300 from a camera when the captured image 310 is captured.

An operation indicated by the following Formulas (1) to (3) is performed in units of pixels between the captured image 310 and the standard image 320.

$$R(i)=Ra(i)+(Y_{MAX}-Rb(i)) \quad (1)$$

$$G(i)=Ga(i)+(Y_{MAX}-Gb(i)) \quad (2)$$

$$B(i)=Ba(i)+(Y_{MAX}-Bb(i)) \quad (3)$$

In Formula (1), a variable i is an index identifying a pixel, and variables Ra(i), Ga(i), and Ba(i) indicate pixel values of R (red), G (green), and B (blue) of the pixel i in the captured image 310. Variables Rb(i), Gb(i), and Bb(i) indicate pixel values of R, G and B of the pixel i in the standard image 320. $Y_{MAX}$ is a maximum value of a pixel value common to colors of R, G, and B. When each of the pixels of R, G, and B has a bit depth of 8 bits, $Y_{MAX}$ is 255.

The pixel values R(i), G(i) and B(i) obtained as a result of the operation of Formulas (1) to (3) are pixel values of a corrected image obtained by correcting the captured image 310 using the standard image 320. In the corrected image, a component of the standard image 320 is deducted from the captured image 310, a pixel of a portion common to the captured image 310 and the standard image 320 has the pixel value $Y_{MAX}$, and a pixel value of the captured image 310 are held for a pixel of a portion of the captured image 310 different from the standard image 320. Thus, the user image 301' is held, and the pixel value $Y_{MAX}$ is used for the other portion. In addition, the pixel values R(i), G(i) and B(i) is an example of a corrective value indicating degree of the correction to the captured image. Thus, parameter indicating the corrective value is not limited to the pixel value.

As the captured image 310 is corrected using the standard image 320 as described above, pixel values of portions of the captured image 310 other than the user image 301' become uniform, and thus the accuracy of threshold determination for binarization is improved. Thus, it is possible to extract the region of the user image 301' from the captured image 310 easily and accurately.

More Specific Example of First Embodiment

Figure 2:
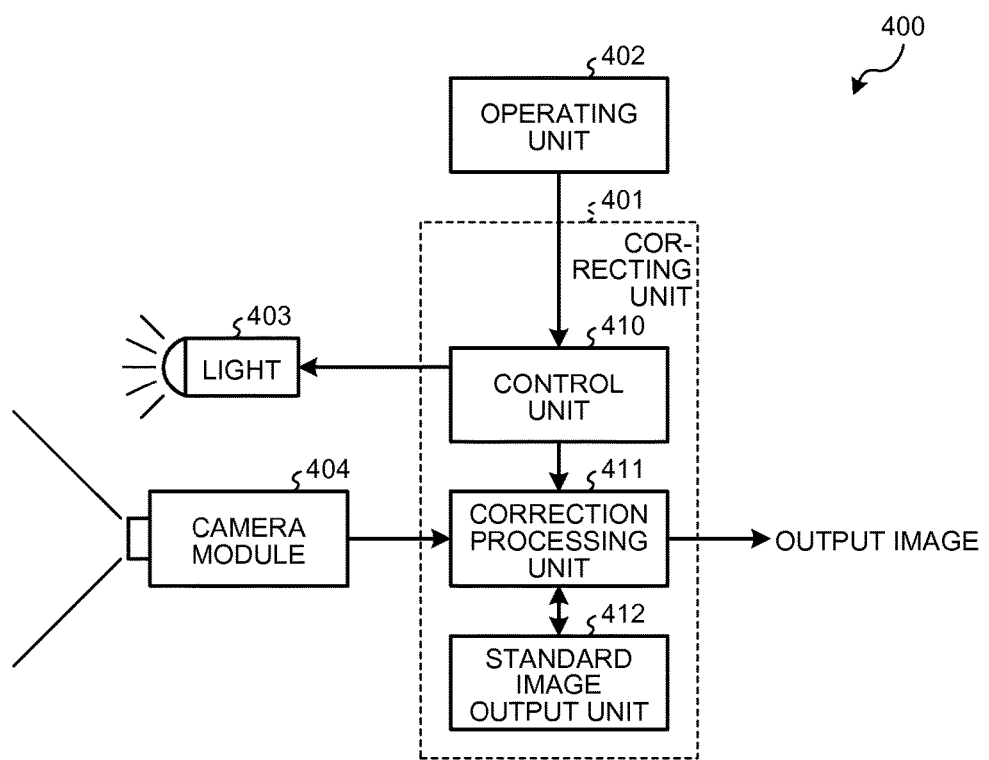
FIG. 2 is a block diagram illustrating an exemplary configuration of an information processing device according to the first embodiment.

Next, a more specific example of the first embodiment will be described. FIG. 2 illustrates an exemplary configuration of an information processing device 400 according to the first embodiment. The information processing device 400 includes a correcting unit 401, an operating unit 402, a light 403, and a camera module 404. The correcting unit 401 includes a control unit 410, a correction processing unit 411, and a standard image output unit 412. The information processing device 400 functions as a multi-function mobile terminal, and the correcting unit 401, the operating unit 402, the light 403, and the camera module 404 are configured to be portable as a single body.

In the information processing device 400, the operating unit 402 includes various kinds of operators receiving the user's operation. A so-called touch panel in which a display device is integrated with an input device that outputs a control signal according to a contact position may be used as the operating unit 402. The light 403 is a light emitting unit that emits light according to control of the control unit 410. For example, the light 403 is a non-directional light source serving as a point light source. The light 403 is not limited to a point light source, and a light source having other characteristics may be used.

The camera module 404 includes a capturing element such as a Charge Coupled Device (CCD) or a Complementary Metal Oxide Semiconductor (CMOS) imager, a drive circuit that drives a capturing element, and a capturing signal processing unit that performs certain signal processing on a capturing signal output from the capturing element, and outputs a captured image serving as digital data. For example, the camera module 404 outputs the captured image with a certain frame period.

The correcting unit 401 performs the correction using the standard image on the captured image output from the camera module 404, and outputs an output image. In the correcting unit 401, the control unit 410 controls an operation of the information processing device 400 in general. According to control of the control unit 410, the correction processing unit 411 performs the operation indicated by Formulas (1) to (3) on the captured image output from the camera module 404 using the standard image, and outputs an output image in which the captured image is corrected. The standard image output unit 412 outputs the standard image according to an instruction given from the correction processing unit 411.

For example, the correcting unit 401 includes a Central Processing Unit (CPU), a Read Only Memory (ROM), and a Random Access Memory (RAM), operates according to an information processing program previously stored in the ROM using the RAM as a work memory, and executes a correction process on the captured image according to the first embodiment. Each of the control unit 410, the correction processing unit 411, and the standard image output unit 412 may be configured as a module of the information processing program. The information processing program is an application program operating on the information processing device 400, and is appropriately referred to as "app."

Each unit included in the correcting unit 401 is not limited to an example operating as a module of an information processing program. For example, some or all of the control unit 410, the correction processing unit 411, and the standard image output unit 412 included in the correcting unit 401 may be configured by hardware collaborating with each other.

Figure 3:
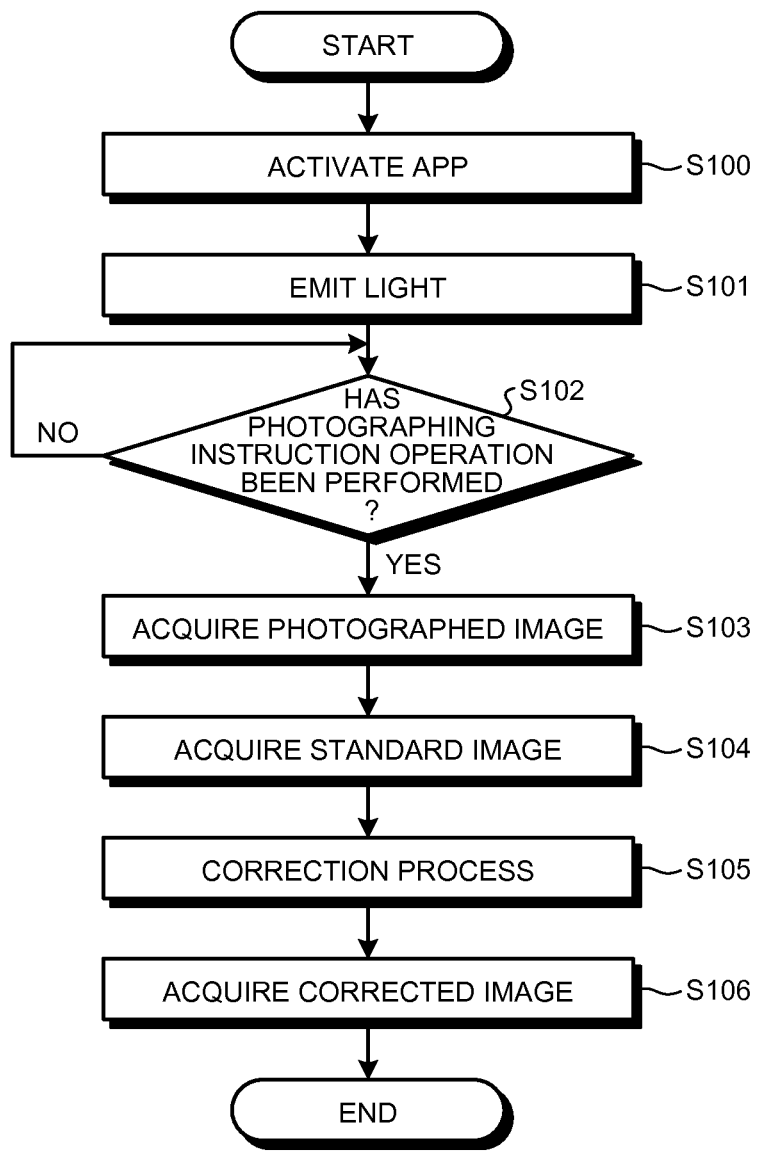
FIG. 3 is an exemplary flowchart illustrating an image correction process according to the first embodiment.

FIG. 3 is an exemplary flowchart illustrating an image correction process according to the first embodiment. For example, when an app according to the first embodiment is activated according to the user's operation on the operating unit 402 in step S100, in step S101, the control unit 410 turns on the light 403 to emit light. The light 403 may be turned on according to the user's operation on the operating unit 402. In step S102, the control unit 410 is on standby for a capturing instruction. For example, when a capturing instruction operation is determined to have been performed on the operating unit 402, the control unit 410 causes the process to proceed to step S103. On the other hand, when no capturing instruction operation is determined to have been performed on the operating unit 402, the control unit 410 causes the process to return to step S102.

Further, when the sheet 300 on which the user image 301 is drawn is captured, it is desirable to keep a capturing plane in the camera module 404 and the sheet 300 to be as parallel as possible. Further, it is desirable to adjust a distance between the sheet 300 and the information processing device 400 or an angle of view by the camera module 404 so that the sheet 300 is captured to be as large as possible in an effective capturing region of the capturing element in the camera module 404.

In step S103, the correction processing unit 411 acquires the captured image 310 output from the camera module 404. In other words, the correction processing unit 411 functions as a captured image acquiring unit that acquires the captured image 310 output from the camera module 404. The correction processing unit 411 stores the acquired captured image 310, for example, in a frame memory (not illustrated). After acquiring the captured image 310 through the correction processing unit 411 in step S103, the control unit 410 may turn off the light 403.

In step S104, the correction processing unit 411 acquires the standard image 320 from the standard image output unit 412. For example, the correction processing unit 411 requests the standard image output unit 412 to send the standard image 320, and the standard image output unit 412 outputs the standard image 320 to the correction processing unit 411 in response to the request.

Figure 4:
FIG. 4 is a diagram illustrating an exemplary characteristic of a standard image according to the first embodiment.

Here, the standard image output unit 412 may read and output the standard image 320 that is generated and stored in the ROM or the like in advance, or may calculate and output data of the standard image 320 according to a certain calculation formula or the like in units of pixels. FIG. 4 illustrates an exemplary characteristic of the standard image 320 according to the first embodiment. Referring to FIG. 4, a vertical axis indicates brightness, that is, brightness Y, and a horizontal axis indicates a distance d from an image center serving as the front of the light 403. As illustrated in FIG. 4, in the standard image 320, the brightness Y decreases according to the distance d from the image center. The standard image output unit 412 may include a function or a table indicating a relation between the brightness Y and the distance d and obtain pixel values of pixels of the standard image 320 based on the function or the table.

In step 3105, the correction processing unit 411 corrects the captured image 310 acquired in step S103 using the standard image 320 acquired in step S104. At this time, the correction processing unit 411 performs the operation according to Formulas (1) to (3) for each of the pixels of the standard image 320 and the captured image 310, and corrects the captured image 310.

For example, the correction processing unit 411 causes the standard image 320 acquired in step S104 to be stored in the RAM or the like. The correction processing unit 411 reads the standard image 320 from the RAM in units of pixels, and reads the pixel of the captured image 310 whose position corresponds to the read pixel from the frame memory in which the captured image 310 is stored in step S103. Then, the operation indicated by Formulas (1) to (3) is performed using the pixel of the standard image 320 and the pixel of the captured image 310 that are read from the RAM and the frame memory.

The present invention is not limited to this example, and the correction processing unit 411 may receive the pixel of the standard image 320 from the standard image output unit 412 in units of pixels in step S104 and then perform the correction process.

In step S106, the correction processing unit 411 acquires the corrected image obtained by correcting the captured image 310 in step S105. The correction processing unit 411 outputs the acquired corrected image to the outside of the correcting unit 401 as an output image. For example, the output image is supplied to an image extracting unit, the binarization process is performed to decide the pixels of the user image 301', and the region of the user image 301' is extracted based on the decided pixels.

The standard image 320 has been described to be given in advance, but the present invention is not limited to this example. For example, the standard image 320 may be generated before the sheet 300 on which the user image 301 is drawn is captured. For example, in the information processing device 400, actually, the light 403 is caused to emit light, and an angle of view by the camera module 404 is caused to match an angle of view at which the sheet 300 on which the user image 301 is drawn is captured. In this state, the user image 301 is not drawn, and a new sheet having the same ground color as the sheet 300 is captured. The captured image 310 may be used as the standard image 320. In this case, even when the sheet 300 is not white, the correction process can be performed.

As described above, in the first embodiment, the captured image 310 obtained by capturing the sheet 300 in the state in which the light 403 is turned on is corrected using the standard image 320 having the brightness distribution of the plane by irradiation of the light 403 at the distance given as the distance of the sheet 300 from the camera (the capturing element of the camera module 404) when the captured image 310 is captured. Thus, the corrected image obtained by correcting the captured image 310 is uniform in the brightness distribution by irradiation of the light 403, and thus the user image 301' is easily extracted.

Figure 5:
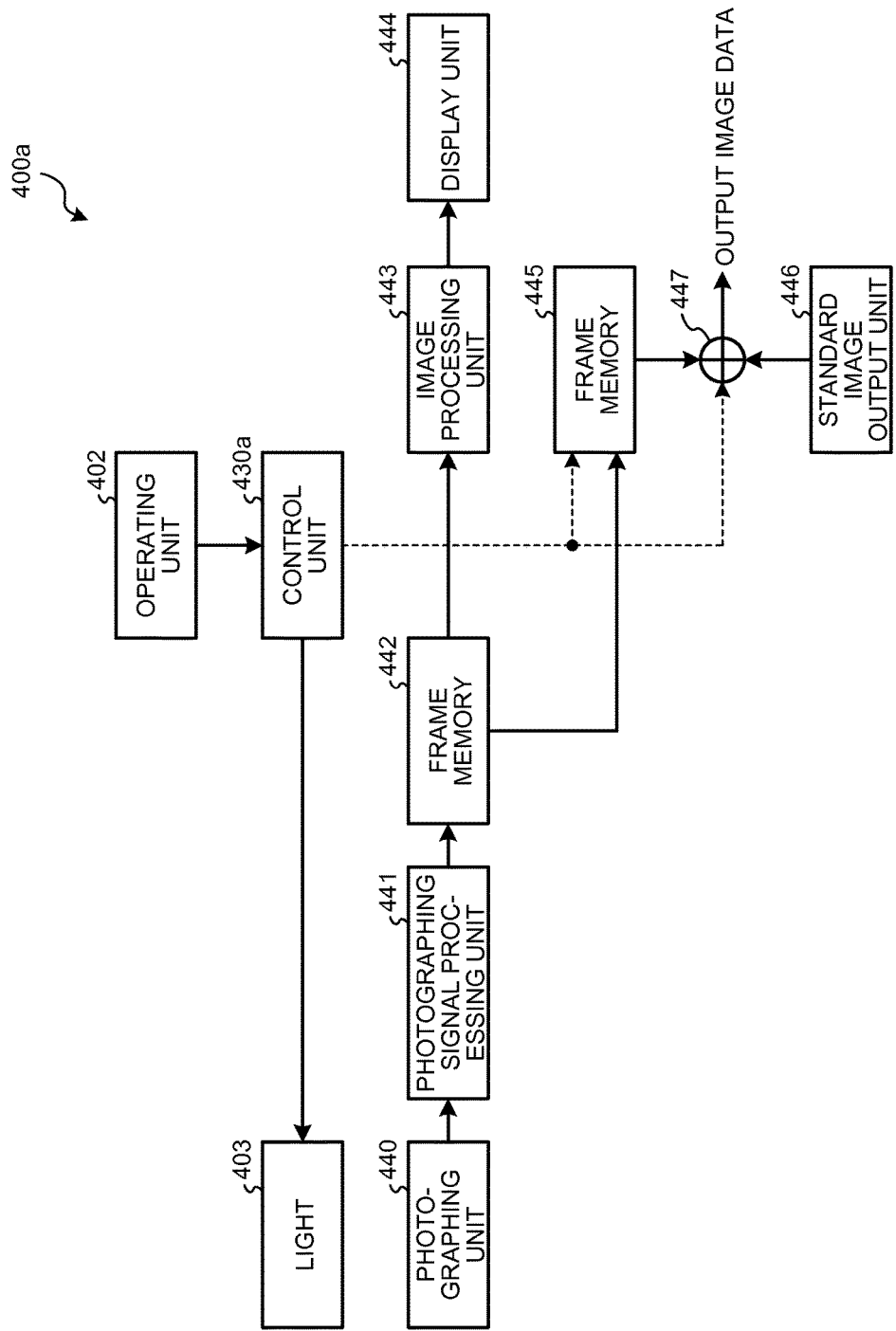
FIG. 5 is a block diagram more specifically illustrating an exemplary configuration of an information processing device according to the first embodiment.

FIG. 5 more specifically illustrates an exemplary configuration of an information processing device according to the first embodiment. In FIG. 5, the same components as in FIG. 2 are denoted by the same reference numerals, and a detailed description thereof is omitted. Referring to FIG. 5, an information processing device 400a includes an operating unit 402, a light 403, a control unit 430a, a capturing unit 440, a capturing signal processing unit 441, frame memories 442 and 445, an image processing unit 443, a display unit 444, a standard image output unit 446, and an operation unit 447.

Of these, the capturing unit 440 and the capturing signal processing unit 441 are included in the camera module 404 of FIG. 2. The control unit 430a corresponds to the control unit 410 of FIG. 2. Further, the control unit 430a has a function of the captured image acquiring unit in the correction processing unit 411 of FIG. 2. The frame memories 442 and 445, the image processing unit 443, and the operation unit 447 are included in the correction processing unit 411. The standard image output unit 44E corresponds to the standard image output unit 412, and outputs the image data (standard image data) of the standard image. The display unit 444 includes a display device such as a Liquid Crystal Display (LCD) and a drive circuit that drives the display device.

A control signal according to the user's operation is input from the operating unit 402 to the control unit 430a. The control unit 430a controls lighting of the light 403. As will be described later, the control unit 430a controls a read/write timing of the frame memory 445 and an operation of the operation unit 447.

The capturing unit 440 outputs an analog capturing signal with a frame period according to a clock (not illustrated). The analog capturing signal output from the capturing unit 440 is input to the capturing signal processing unit 441. The capturing signal processing unit 441 performs certain signal processing such as noise reduction and gain control on the input capturing signal. The capturing signal processing unit 441 performs A/D conversion on the analog capturing signal that has been subjected to the certain signal processing to convert the analog capturing signal into digital captured image data, and outputs the digital captured image data. The captured image data output from the capturing signal processing unit 441 is stored in the frame memory 442 in units of frames.

The image processing unit 443 reads the captured image data from the frame memory 442 in units of frames, performs image processing such as a gamma correction process and a white balance adjustment process on the read captured image data, and outputs resultant data. For example, the image data that is obtained by performing the image processing on the captured image data and output from the image processing unit 443 is supplied to the display unit 444 and displayed on the display device. Thus, it is possible to cause the display unit 444 to function as a finder used to check the captured image captured by the capturing unit 440.

The control unit 430a causes captured image data of one frame stored in the frame memory 442 to be stored in the frame memory 445 according to a capturing instruction on the operating unit 402, and acquires captured image data of a processing target (step 3103 of FIG. 3). The operation unit 447 performs the operation according to Formulas (1) to (3) between the standard image output from the standard image output unit 446 and the captured image data stored in the frame memory 445 according to control of the control unit 430a, so that corrected image data in which the captured image data is corrected is acquired. The operation unit 447 outputs the corrected image data as an output image data.

First Modified Example of First Embodiment

Next, a first modified example of the first embodiment will be described. In the first embodiment, the user adjusts the distance (an angle of view by the capturing unit 440) between the information processing device 400a and the sheet 300 so that the user image 301 is included in the captured image while checking the display of the display unit 444, and performs the user's operation to give the capturing instruction.

In the first modified example of the first embodiment, a frame image indicating a region in which the user is allowed to draw the user image 301 on the sheet 300 is formed in advance. Further, the information processing device recognizes a frame image included in a captured image, and acquires the captured image automatically when the frame image is detected from the captured image. The user can easily acquire the captured image appropriately including the user image 301 and acquire the captured image without performing an operation to give the capturing instruction to the information processing device.

Figure 6:
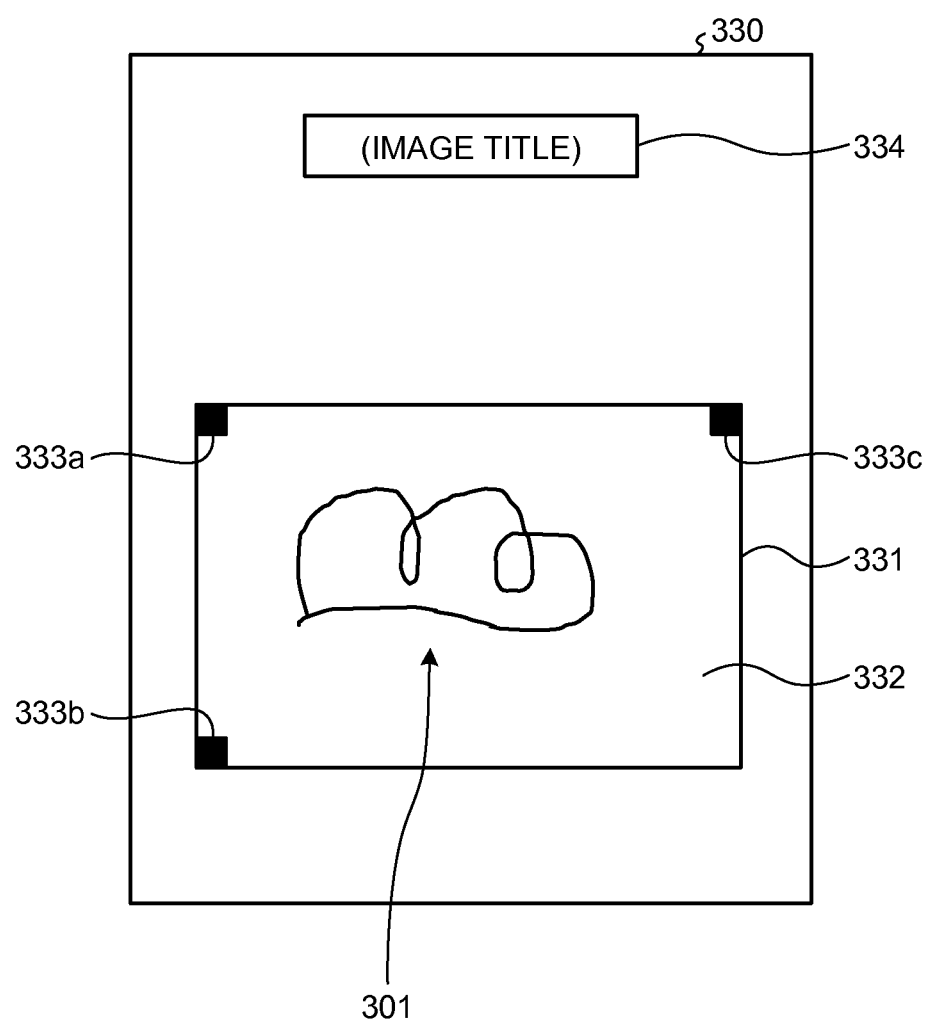
FIG. 6 is a diagram illustrating an exemplary sheet on which a frame image is formed according to a first modified example of the first embodiment.

FIG. 6 illustrates an exemplary sheet on which a frame image is formed according to the first modified example of the first embodiment. Referring to FIG. 6, a frame image 331 indicating a region 332 in which the user image 301 drawn is formed on a sheet 330 in advance. In the example of FIG. 6, in addition to the rectangular frame image 331, markers 333a, 333b, and 333c are formed at three positions among four positions of the frame image 331. An outer edge of the region 332 and a direction of the region 332 can be determined by detecting the markers 333a, 333b, and 333c at the three positions by image recognition. A title of the user image 301 drawn in the region 332 can be written in a region 334.

Figure 7:
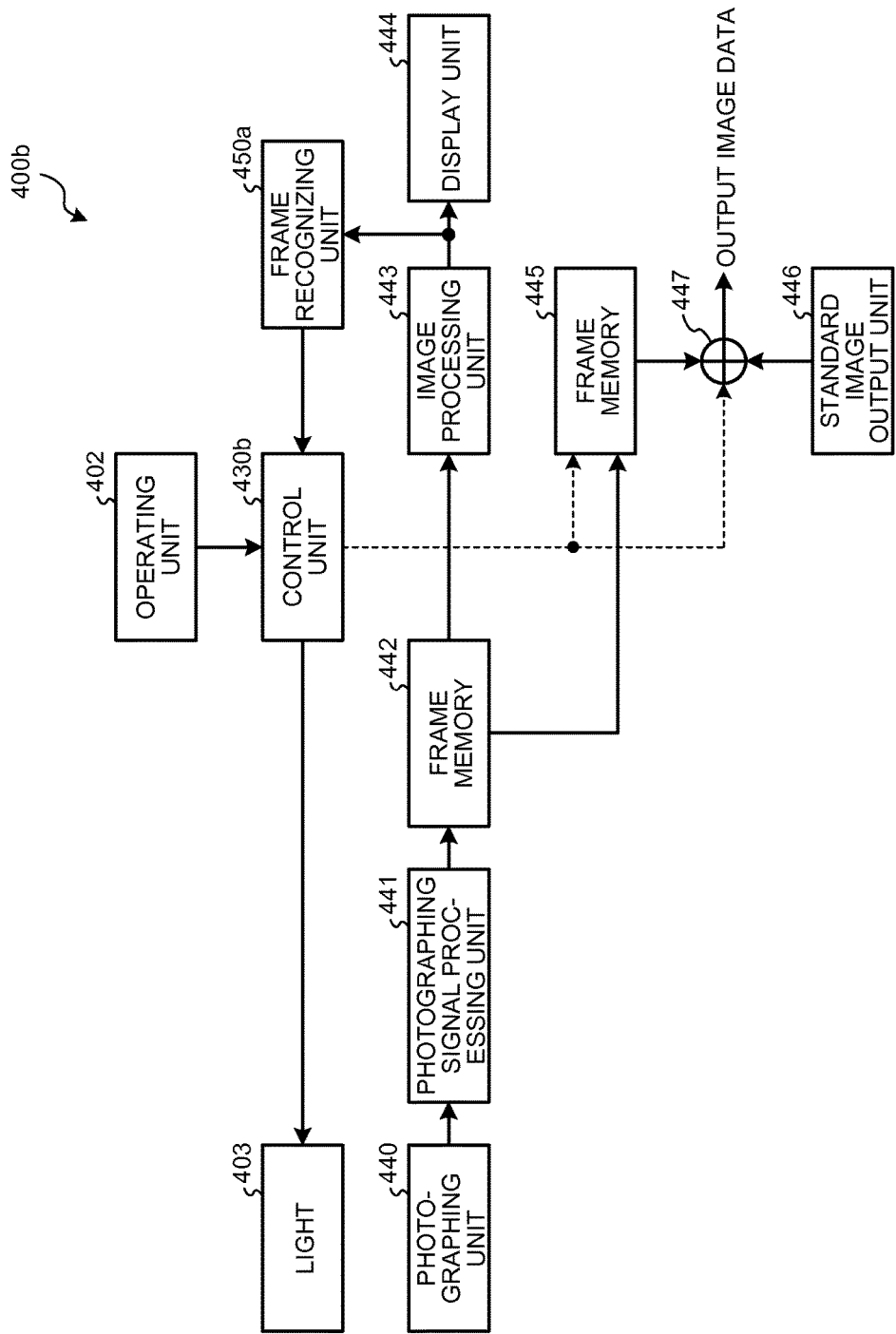
FIG. 7 is a block diagram illustrating an exemplary configuration of an information processing device according to the first modified example of the first embodiment.

FIG. 7 illustrates an exemplary configuration of an information processing device according to the first modified example of the first embodiment. In FIG. 7, the same components as in FIG. 5 are denoted by the same reference numerals, and a detailed description thereof is omitted.

Referring to FIG. 7, an information processing device 400b has a configuration in which a frame recognizing unit 450a is added to the information processing device 400a of FIG. 5. The frame recognizing unit 450a recognizes the frame image 331 included in the image data output from the image processing unit 443, and detects the frame image 331.

For example, the frame recognizing unit 450a is considered to store image pattern information corresponding to the frame image 331 in advance and detect the frame image 331 by comparing the image pattern information with the image data. The frame recognizing unit 450a may detect the frame image 331 based on the image pattern information corresponding to the markers 333a to 333c. Further, the frame recognizing unit 450a determines whether or not the frame image 331 is recognized at a certain position within the image data. Thus, the frame image 331 of a certain size included in the captured image can be recognized.

Figure 8:
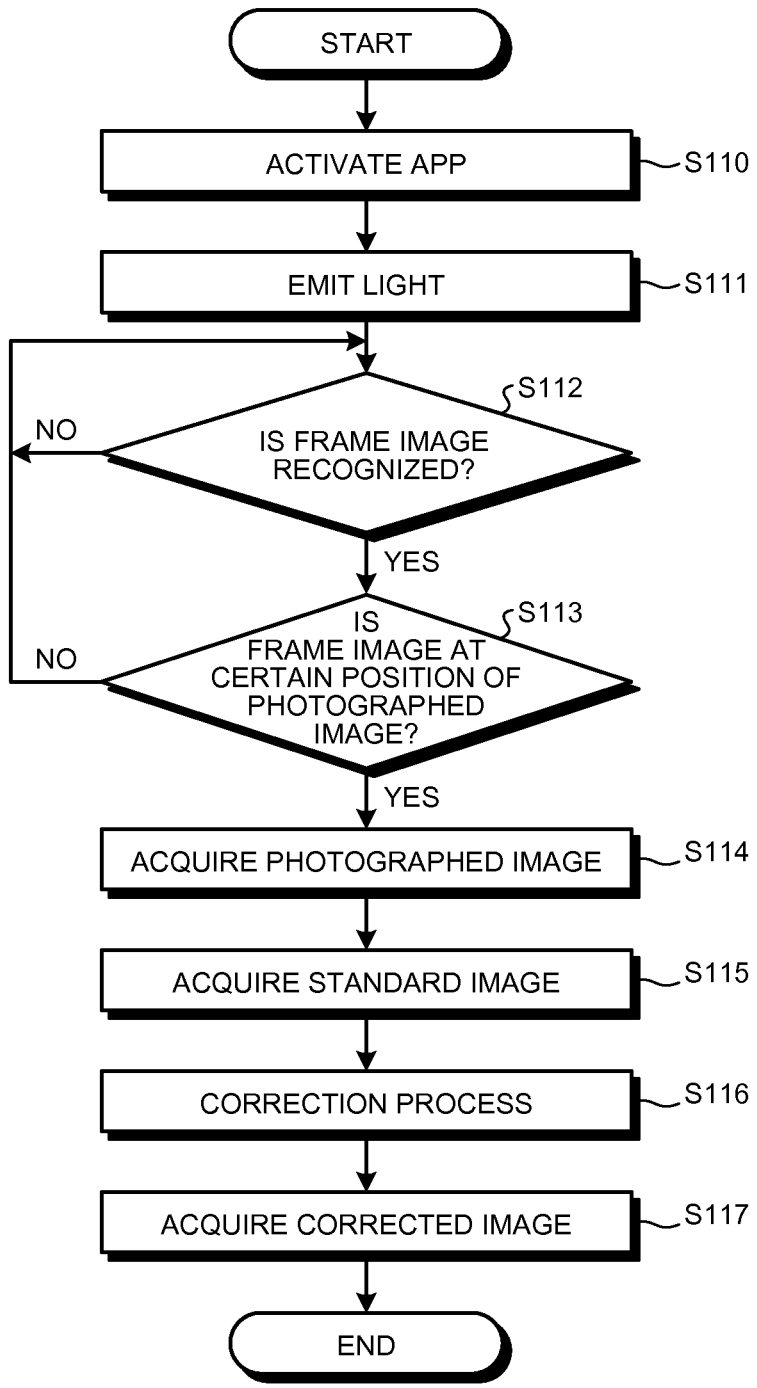
FIG. 8 is an exemplary flowchart illustrating an image correction process according to the first modified example of the first embodiment.

FIG. 8 is an exemplary flowchart illustrating an image correction process according to the first modified example of the first embodiment. For example, when an app according to the first modified example of the first embodiment is activated according to the user's operation on the operating unit 402 in step S110, in step S111, a control unit 430b turns on the light 403 to emit light.

In step S112, the frame recognizing unit 450a determines whether or not the frame image 331 is recognized from the image data output from the image processing unit 443. When the frame image 331 is determined to be not recognized, the frame recognizing unit 450a causes the process to return to step S112. On the other hand, when the frame image 331 is determined to be recognized in the image data, the frame recognizing unit 450*a* causes the process to proceed to step S113.

In step S113, the frame recognizing unit 450*a* determines whether or not the frame image 331 recognized in step S112 is at a certain position within the image data. When the frame image 331 is determined to be not at the certain position, the frame recognizing unit 450*a* causes the process to return to step S112. On the other hand, when the frame image 331 is determined to be not at the certain position within the image data, the frame recognizing unit 450*a* causes the process to proceed to step S114.

In step S114, the control unit 430*b* reads the captured image data of one frame from the frame memory 442, stores the captured image data of one frame in the frame memory 445, and acquires the captured image data of the processing target. In step S115, the control unit 430*b* acquires the standard image data output from the standard image output unit 446. For example, the control unit 430*b* controls the operation unit 447 such that the standard image data output from the standard image output unit 446 is input to the operation unit 447.

In step S116, the operation unit 447 corrects the captured image data stored in the frame memory 445 in step S114 using the standard image data input in step S115 according to Formulas (1) to (3). The operation unit 447 acquires the corrected image data that is corrected by the correction process (step S117). The operation unit 447 outputs the acquired corrected image data to, for example, an image extracting unit (not illustrated).

Second Modified Example of First Embodiment

Next, a second modified example of the first embodiment will be described. In the second modified example, in addition to the frame recognition function according to the first modified example, a frame guide image used to position the frame image 331 is displayed on a finder screen used to check a capturing state displayed on the display unit 444. In other word, the finder screen allows the user to confirm visually the drawing target to be captured. Further, it is determined whether or not the frame image 331 is displayed within a certain range on the frame guide image in the finder screen.

Figure 9:
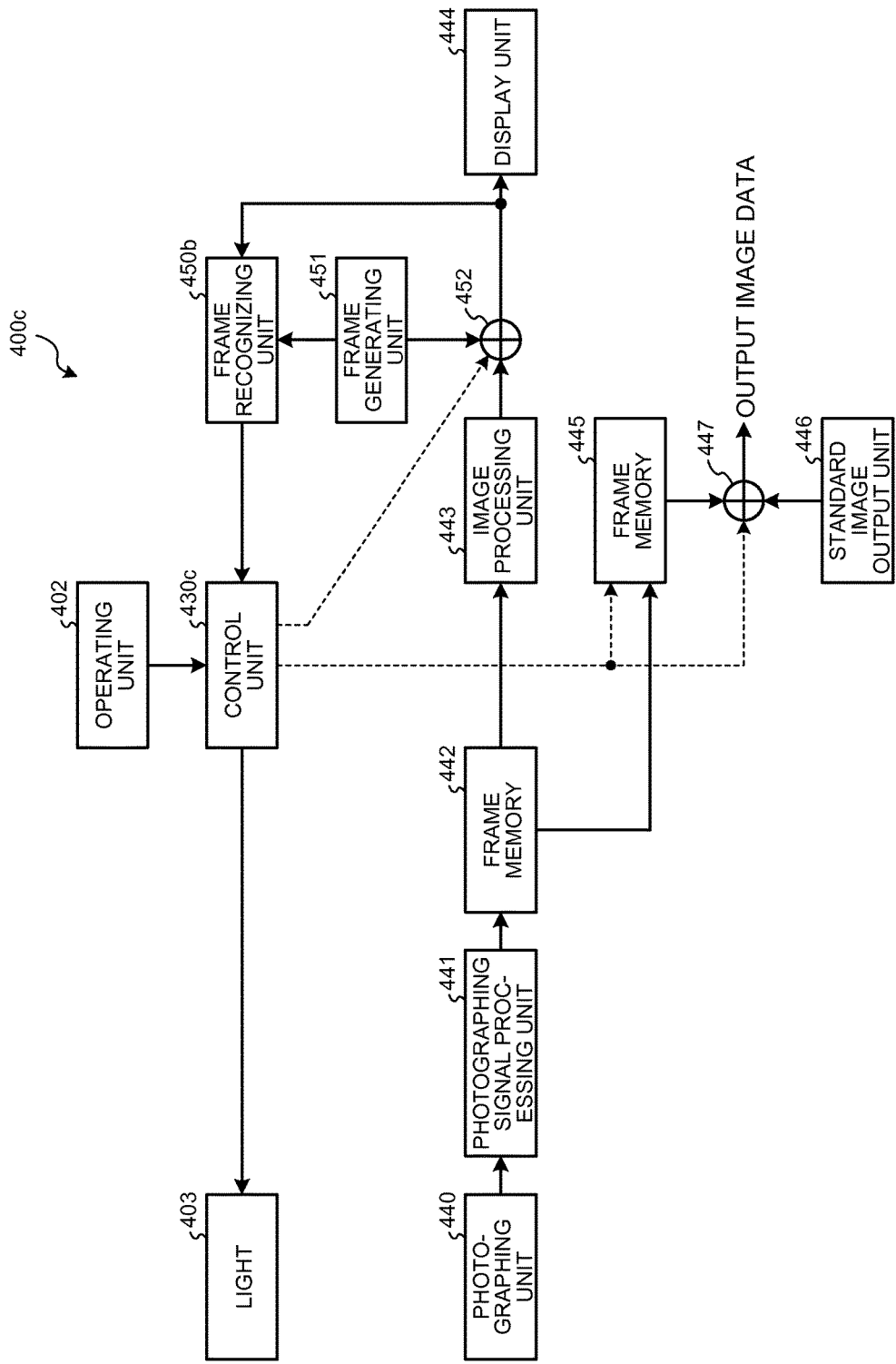
FIG. 9 is a block diagram illustrating an exemplary configuration of an information processing device according to a second modified example of the first embodiment.

FIG. 9 illustrates an exemplary configuration of an information processing device according to the second modified example of the first embodiment. In FIG. 9, the same components as in FIG. 5 are denoted by the same reference numerals, and a detailed description thereof is omitted. Referring to FIG. 9, an information processing device 400*c* has a configuration in which a frame recognizing unit 450*b*, a frame generating unit 451, and a synthesizing unit 452 are added to the information processing device 400*a* of FIG. 5.

Figure 10:
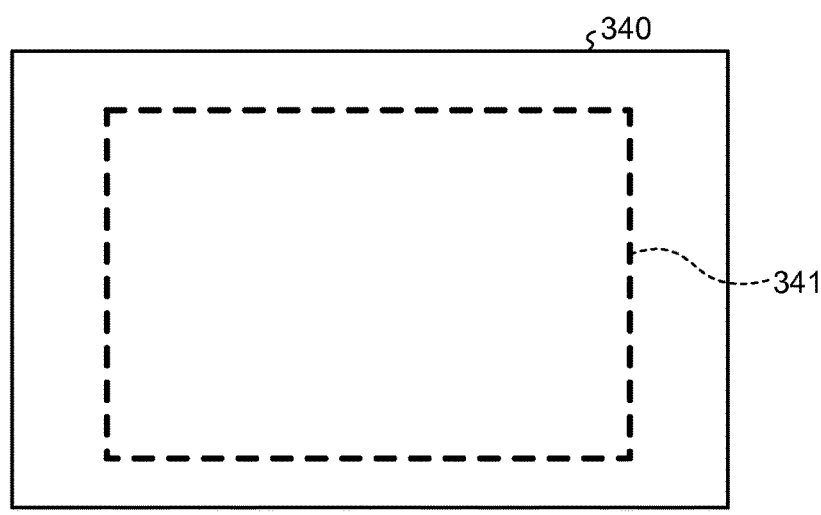
FIG. 10 is a diagram illustrating a state in which a frame guide image is displayed on a finder screen according to the second modified example of the first embodiment.

The frame generating unit 451 generates a frame guide image to be displayed on a finder screen. The synthesizing unit 452 synthesizes the frame guide image generated by the frame generating unit 451 with the image data output from the image processing unit 443 according to control of a control unit 430*c*, and generates image data with a guide in which the frame guide image is arranged at a certain position in an image based on the image data. FIG. 10 illustrates a state in which a frame guide image 341 is displayed in a finder screen 340 according to the second modified example of the first embodiment. The frame generating unit 451 transfer information indicating coordinates of the frame guide image 341 within the image data to the frame recognizing unit 450*b*.

Similarly to the frame recognizing unit 450*a*, the frame recognizing unit 450*b* recognizes the frame image 331 included in the image data that is output from the image processing unit 443 and supplied through the synthesizing unit 452, and detects the frame image 331. Further, the frame recognizing unit 450*b* determines whether or not the frame image 331 detected from the image data falls within a certain range on the frame guide image 341 generated by the frame generating unit 451 based on the information indicating the coordinates of the frame guide image 341 transferred from the frame generating unit 451.

Figure 11:
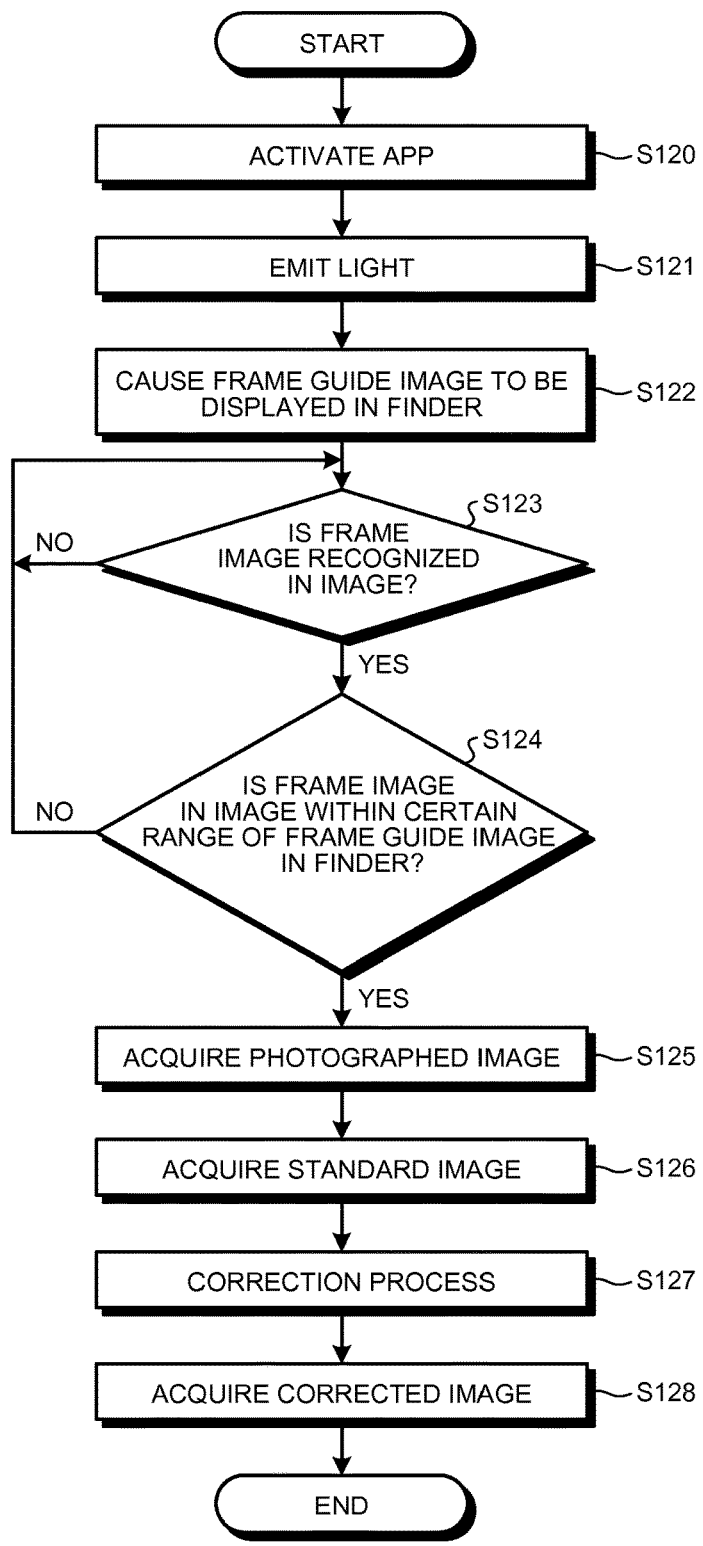
FIG. 11 is an exemplary flowchart illustrating an image correction process according to the second modified example of the first embodiment.

FIG. 11 is an exemplary flowchart illustrating an image correction process according to the second modified example of the first embodiment. For example, when an app according to the second modified example of the first embodiment is activated according to the user's operation on the operating unit 402 in step S120, in step S121, the control unit 430*c* turns on the light 403 to emit light.

In step S122, the frame generating unit 451 generates the frame guide image 341, supplies the frame guide image 341 to the synthesizing unit 452, and causes the frame guide image 341 to be displayed within the finder screen 340. At this time, the frame generating unit 451 transfers the information indicating the coordinates of the frame guide image 341 in the finder screen 340, that is, information indicating the coordinates within the image data output from the image processing unit 443 to the frame recognizing unit 450*b*.

In step S123, the frame recognizing unit 450*b* determines whether or not the frame image 331 is recognized from the image data output from the image processing unit 443. When the frame image 331 is determined to be not recognized, the frame recognizing unit 450*b* causes the process to return to step S123. On the other hand, when the frame image 331 is determined to be recognized in the image data, the frame recognizing unit 450*b* causes the process to proceed to step S124.

In step S124, the frame recognizing unit 450*b* determines whether or not the frame image 331 included in the image data is displayed within a certain range on the frame guide image 341 based on the coordinate information of the frame guide image 341.

Figure 12:
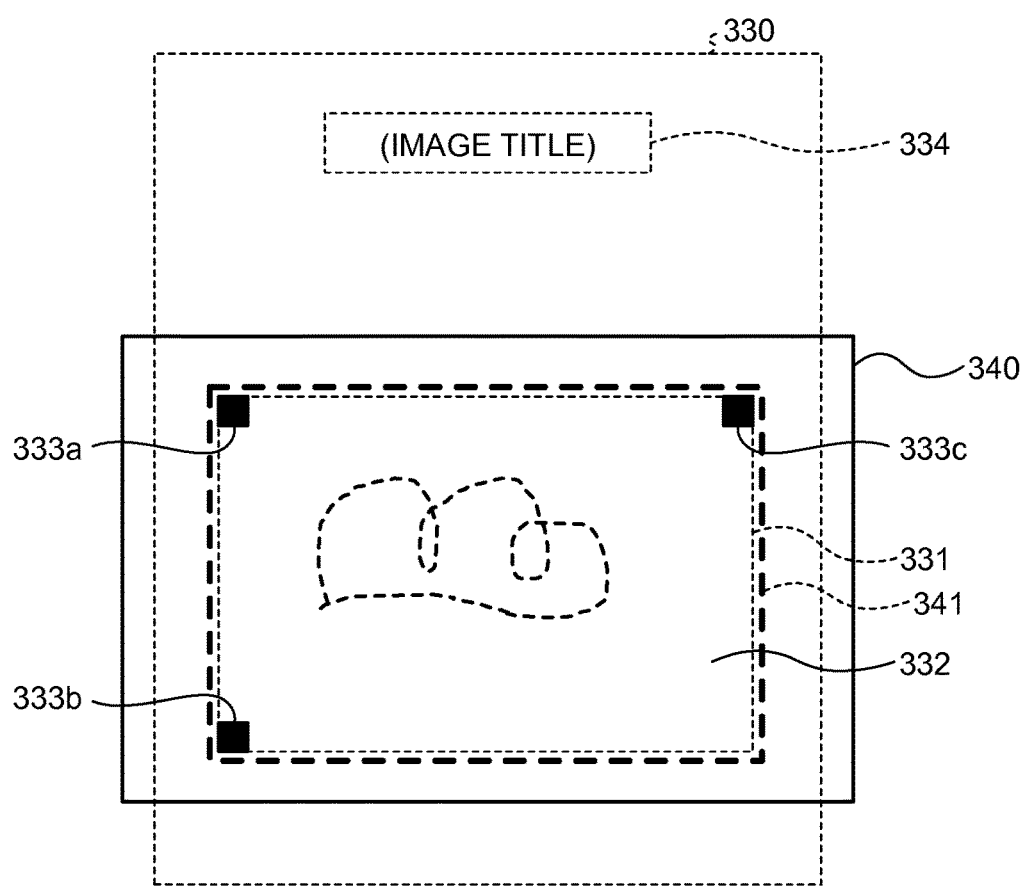
FIG. 12 is a diagram illustrating a state in which an image of a sheet is displayed on a finder screen on which a frame guide image is displayed according to the second modified example of the first embodiment.

FIG. 12 illustrates a state in which an image of the sheet 330 is displayed on the finder screen 340 on which the frame guide image 341 is displayed according to the second modified example of the first embodiment. In the example of FIG. 12, the entire frame image 331 formed on the sheet 330 is included in the frame guide image 341, and a distance between the frame image 331 and the frame guide image 341 falls within a certain range. Thus, the frame recognizing unit 450*b* determines that the frame image 331 is displayed within the certain range on the frame guide image 341.

Here, the distance between the frame image 331 and the frame guide image 341 is a distance between corresponding sides of the frame image 331 and the frame guide image 341. In step S124, the frame recognizing unit 450*b* performs distance determination of sides based on coordinates of the frame image 331 and the frame guide image 341 within the image data, and determines whether or not a relation between the frame image 331 and the frame guide image 341 is a state illustrated in FIG. 12. The frame recognizing unit 450*b* may perform the distance determination by comparing coordinates of four corners of the frame image 331 with coordinates of four corners of the frame guide image 341 instead of sides of the frame image 331 and the frame guide image 341.

In the example illustrated in FIG. 12, the frame image 331 is included in the frame guide image 341, but the present invention is not limited to this example. In other words, even when the frame guide image 341 is included within the frame image 331, the frame recognizing unit 450b determines that the frame image 331 is displayed within the certain range on the frame guide image 341 if the distance between the frame image 331 and the frame guide image 341 falls within the certain range.

For example, the user adjust the distance between the information processing device 400c and the sheet 330 so that the frame image 331 is displayed within a certain range on the frame guide image 341 while checking the finder screen 340 displayed on the display unit 444.

When the frame image 331 is determined to be not displayed within the certain range on the frame guide image 341 in step S124, the frame recognizing unit 450b causes the process to return to step S123. On the other hand, when the frame image 331 is determined to be displayed within the certain range on the frame guide image 341, the frame recognizing unit 450b causes the process to proceed to step S125.

In step S125, the control unit 430c reads the captured image data of one frame from the frame memory 442, and causes the captured image data of one frame to be stored in the frame memory 445, and acquires the captured image data of the processing target. In step S126, the control unit 430c acquires the standard image data output from the standard image output unit 446. For example, the control unit 430c controls the operation unit 447 such that the standard image data output from the standard image output unit 446 is input to the operation unit 447.

In step S127, the operation unit 447 corrects the captured image data stored in the frame memory 445 in step S125 according to Formulas (1) to (3) using the standard image data input in step S126. The operation unit 447 acquires the corrected image data that is corrected by the correction process (step S128). The operation unit 447 outputs the acquired corrected image data to, for example, an image extracting unit (not illustrated).

As described above, in the second modified example of the first embodiment, since the frame guide image 341 is displayed within the finder screen 340, the process of capturing the frame image 331 in the captured image with an appropriate size can be easily performed. Further, it is possible to acquire the captured image without performing an operation to give the capturing instruction to the information processing device 400c.

Third Modified Example According to First Embodiment

Next, a third modified example according to the first embodiment will be described. When the sheet 330 is captured, if the capturing plane of the capturing element of the capturing unit 440 is not parallel to the sheet 330, trapezoidal distortion occurs in the captured image of the sheet 330. More specifically, the frame image 331 that has to be captured originally in a rectangular shape becomes an image deformed in a trapezoidal shape according to an angle of the capturing plane to the sheet 330 in the captured image. In this case, the brightness distribution of the captured image by light irradiation of the light 403 is different from the brightness distribution of the standard image, and although the operation according to Formulas (1) to (3) is performed, pixel values are not uniform.

In this regard, in the third modified example according to the first embodiment, an inclination of an information processing device is detected, and when the inclination is equal to or larger than a certain value, the acquisition of the captured image is not performed. Here, the inclination is one specific example of shape conditions of the information processing device.

Figure 13:
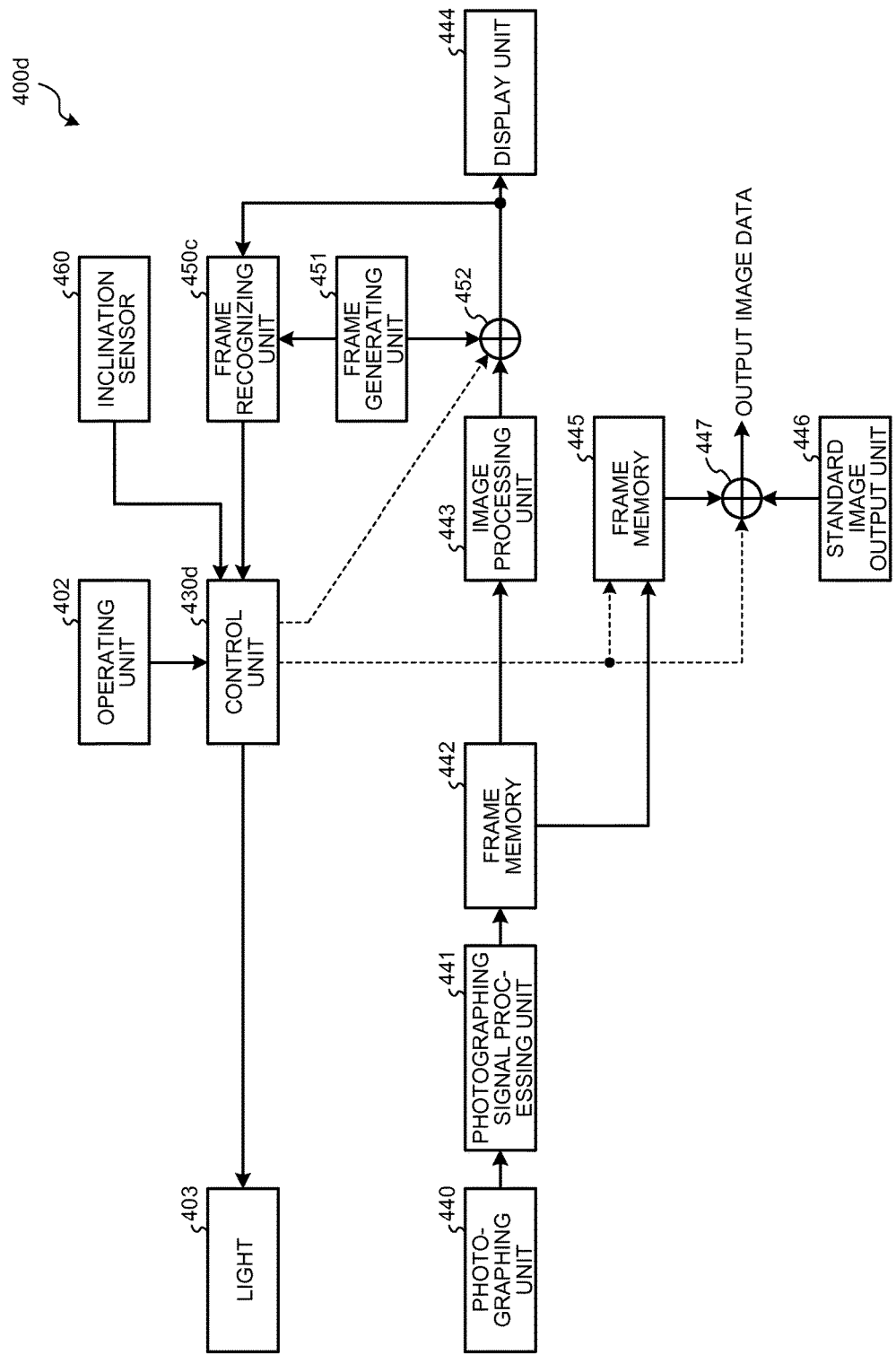
FIG. 13 is a block diagram illustrating an exemplary configuration of an information processing device according to a third modified example of the first embodiment.

FIG. 13 illustrates an exemplary configuration of an information processing device according to the third modified example according to the first embodiment. In FIG. 13, the same components as in FIG. 9 are denoted by the same reference numerals, and a detailed description thereof is omitted. Referring to FIG. 13, an information processing device 400d has a configuration in which an inclination sensor 460 is added to the information processing device 400c of FIG. 9.

For example, the inclination sensor 460 detects the inclination of the information processing device 400d using a gyroscope. The inclination sensor 460 is assumed to be able to detect at least an angle to a horizontal plane as an inclination. The inclination sensor 460 outputs the angle to the horizontal plane as a detection result to be supplied to a control unit 430d.

Figure 14:
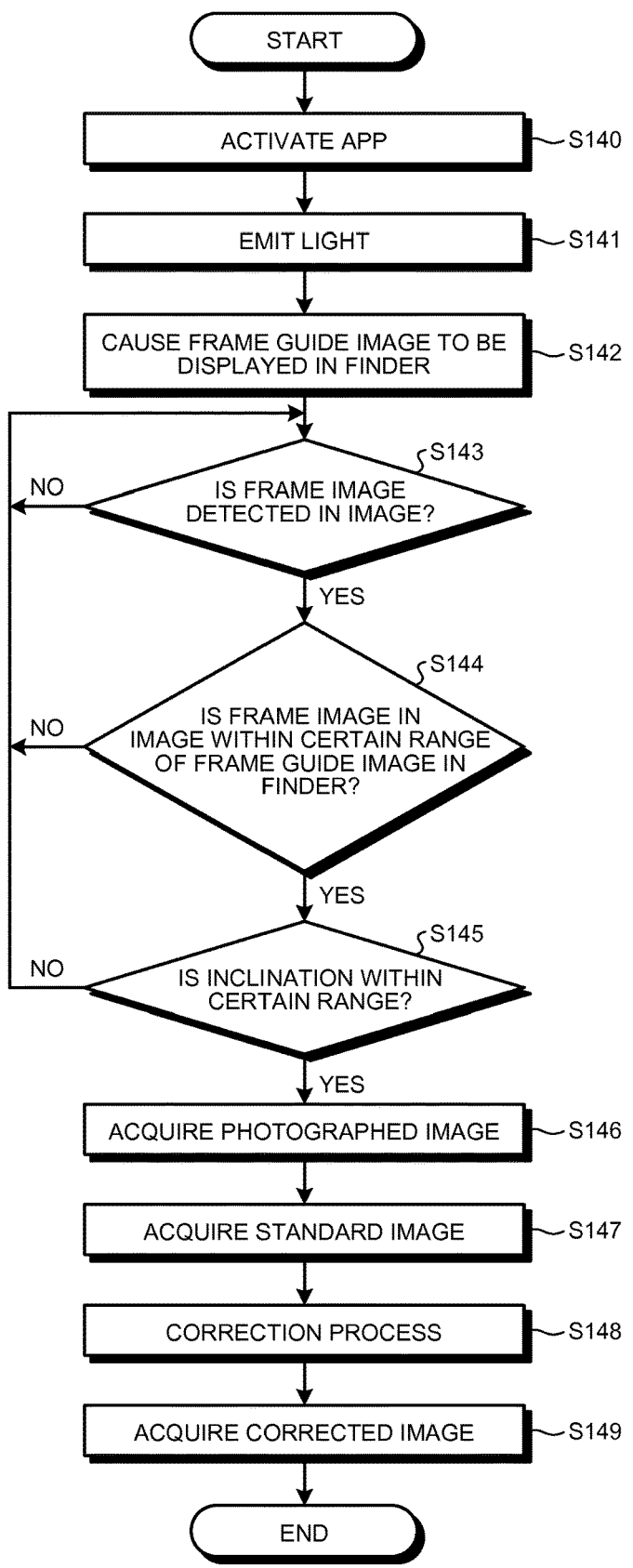
FIG. 14 is an exemplary flowchart illustrating an image correction process according to the third modified example of the first embodiment.

FIG. 14 is an exemplary flowchart illustrating an image correction process according to the third modified example according to the first embodiment. The sheet 330 that includes the user image 301 drawn thereon and serves as the capturing target of the information processing device 400d is assumed to be maintained to be as horizontal as possible. For example, when an app according to the third modified example according to the first embodiment is activated according to the user's operation on the operating unit 402 in step S140, in step S141, the control unit 430d turns on the light 403 to emit light.

In step S142, the frame generating unit 451 generates the frame guide image 341, supplies the frame guide image 341 to the synthesizing unit 452, causes the frame guide image 341 to be displayed on the finder screen 340, and transfer the information indicating the coordinates of the frame guide image 341 in the finder screen 340 to the frame recognizing unit 450b.

In step S143, the frame recognizing unit 450b determines whether or not the frame image 331 is recognized from the image data output from the image processing unit 443. When the frame image 331 is determined to be recognized, the frame recognizing unit 450b causes the process to return to step S143. On the other hand, when the frame image 331 is determined to be recognized in the image data, the frame recognizing unit 450b causes the process to proceed to step S144.

In step S144, the frame recognizing unit 450b determines whether or not the frame image 331 included in the image data is displayed within a certain range on the frame guide image 341 based on the coordinate information of the frame guide image 341. When the frame image 331 is determined to be not displayed within the certain range on the frame guide image 341, the frame recognizing unit 450b causes the process to return to step S143. On the other hand, when the frame image 331 is determined to be displayed within the certain range on the frame guide image 341, the frame recognizing unit 450b causes the process to proceed to step S145.

In step 3145, the control unit 430d determines whether or not the inclination to the horizontal plane of the information processing device 400d is within a certain range based on the detection result supplied from the inclination sensor 460. When the inclination is determined to exceed the certain range, the control unit 430d causes the process to return to step S143. On the other hand, when the inclination is determined to be within the certain range, the control unit 430d causes the process to proceed to step S146.

In step S146, the control unit 430d reads the captured image data of one frame from the frame memory 442, causes the captured image data of one frame to be stored in the frame memory 445, and acquires the captured image data of the processing target. In step S147, the control unit 430d acquires the standard image data output from the standard image output unit 446. In step S148, the operation unit 447 corrects the captured image data stored in the frame memory 445 in step S146 according to Formulas (1) to (3) using the standard image data input in step S147. The operation unit 447 acquires the corrected image data that is corrected by the correction process (step S149). The operation unit 447 outputs the acquired corrected image data to an image extracting unit (not illustrated).

As described above, in the third modified example according to the first embodiment, the inclination of the information processing device is detected, and when the inclination is equal to or larger than a certain value, the acquisition of the captured image is not performed. Thus, it is possible to prevent a situation in which trapezoidal distortion occurs in the captured image since the information processing device 400d is inclined.

Second Embodiment

Next, a second embodiment will be described. In the first embodiment, when the sheet 300 on which the user image 301 is drawn is captured, the user adjusts the position of the information processing device 400 so that the distance between the information processing device 400 and the sheet 300 becomes a certain distance. This is the same in the modified examples of the first embodiment as well as the first embodiment.

Figure 15A:
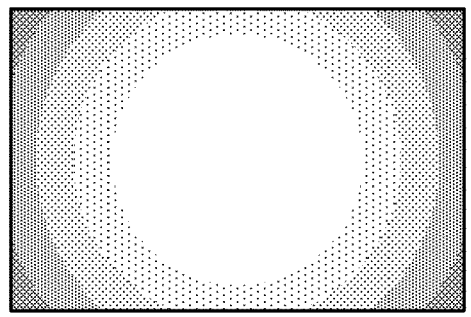
FIGS. 15A to 15D are diagrams for describing a change in a brightness distribution on a subject according to a distance between a light and the subject.
Figure 15B:
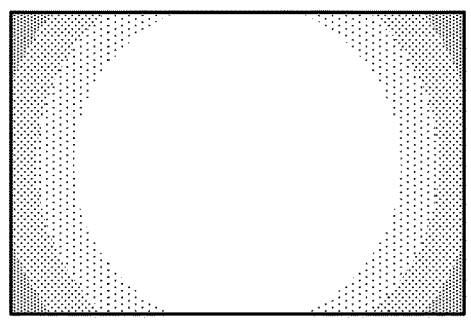
Figure 15C:
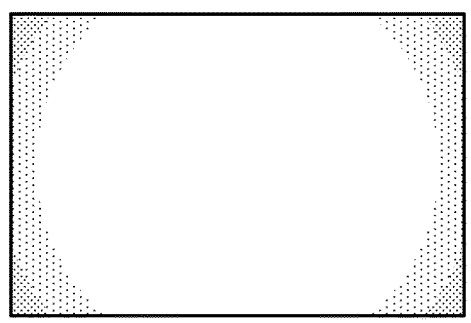
Figure 15D:
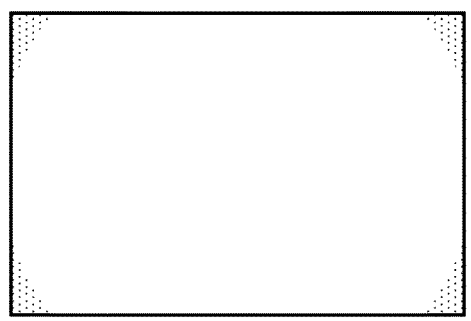

In other words, a tendency of a brightness distribution by light irradiation of the light 403 on a subject changes according to the distance between the light 403 and the subject as illustrated in FIGS. 15A to 15D. In FIGS. 15A to 15D, FIG. 15A illustrates an example of a brightness distribution when the distance between the light 403 and the subject is largest, and FIGS. 15B, 15C, and 15D illustrate examples of brightness distributions when the distance between the light 403 and the subject is sequentially decreased in the described order.

In this example, as the distance between the light 403 and the subject increases, the overall brightness of the subject decreases, and the brightness of the peripheral portion further decreases. Conversely, as the distance between the light 403 and the subject decreases, the overall brightness of the subject increases, and the brightness of the peripheral portion increases as well.

Thus, a plurality of standard images corresponding to the brightness distributions according to each distance are prepared, the distance from the light 403 is measured using a distance sensor, and a standard image according to the distance from the light 403 is selected from a plurality of standard images based on a measurement result. As the captured image is corrected using the selected standard image selected according to the distance, it is possible to obtain an appropriate corrected image by adjusting the position of the information processing device roughly.

FIG. 16 illustrates an exemplary configuration of an information processing device according to the second embodiment. In FIG. 16, the same components as in FIG. 5 are denoted by the same reference numerals, and a detailed description thereof is omitted. Referring to FIG. 16, an information processing device 400e has a configuration in which a distance sensor 470 is added to the information processing device 400a of FIG. 5. As the distance sensor 470, a distance sensor that measures a distance to a subject can be shared when the capturing is performed by the capturing unit 440.

Referring to FIG. 16, a standard image output unit 480 includes a plurality of standard image data 481a, 481b, 481c, and 481d corresponding to a plurality of distances #1, #2, #3, and #4, respectively, and a selector 482 used to select one from the standard image data 481a, 481b, 481c, and 481d. For example, data corresponding to the brightness distribution according to the distance between the light 403 and the subject illustrated in FIGS. 15A to 15D may be used as the standard image data 481a, 481b, 481c, and 481d.

An output of the distance sensor 470 is supplied to a control unit 430e. The control unit 430e acquires the distance to the subject based on the supplied output of the distance sensor 470, and controls the selector 482 according to the acquired distance such that the standard image data according to the distance is selected among the standard image data 481a to 481d. The standard image data selected by the selector 482 among the standard image data 481a to 481d is output to the operation unit 447.

In the above example, the standard image data selected stepwise on the distance is supplied to the operation unit 447, but the present invention is not limited to this example. For example, a method of expressing the characteristic indicating the standard image described with reference to FIG. 4 through a function including a distance value indicating a distance from a subject as a parameter and applying this function to the standard image output unit 480 is also considered. The control unit 430e supplies the distance value based on the output of the distance sensor 470 to the standard image output unit 480 as a parameter. The standard image output unit 480 performs an operation of the function indicating the characteristic of the standard image using the parameter supplied from the control unit 430e, and supplies an operation result to the operation unit 447 as the standard image data corresponding to the distance indicated by the distance value.

Further, the control unit 430e may supply the distance value based on the output of the distance sensor 470 to the standard image output unit 480, and the standard image output unit 480 may interpolate each of the standard image data 481a to 481d based on the distance value and output the standard image data corresponding to the distance value.

Figure 17:
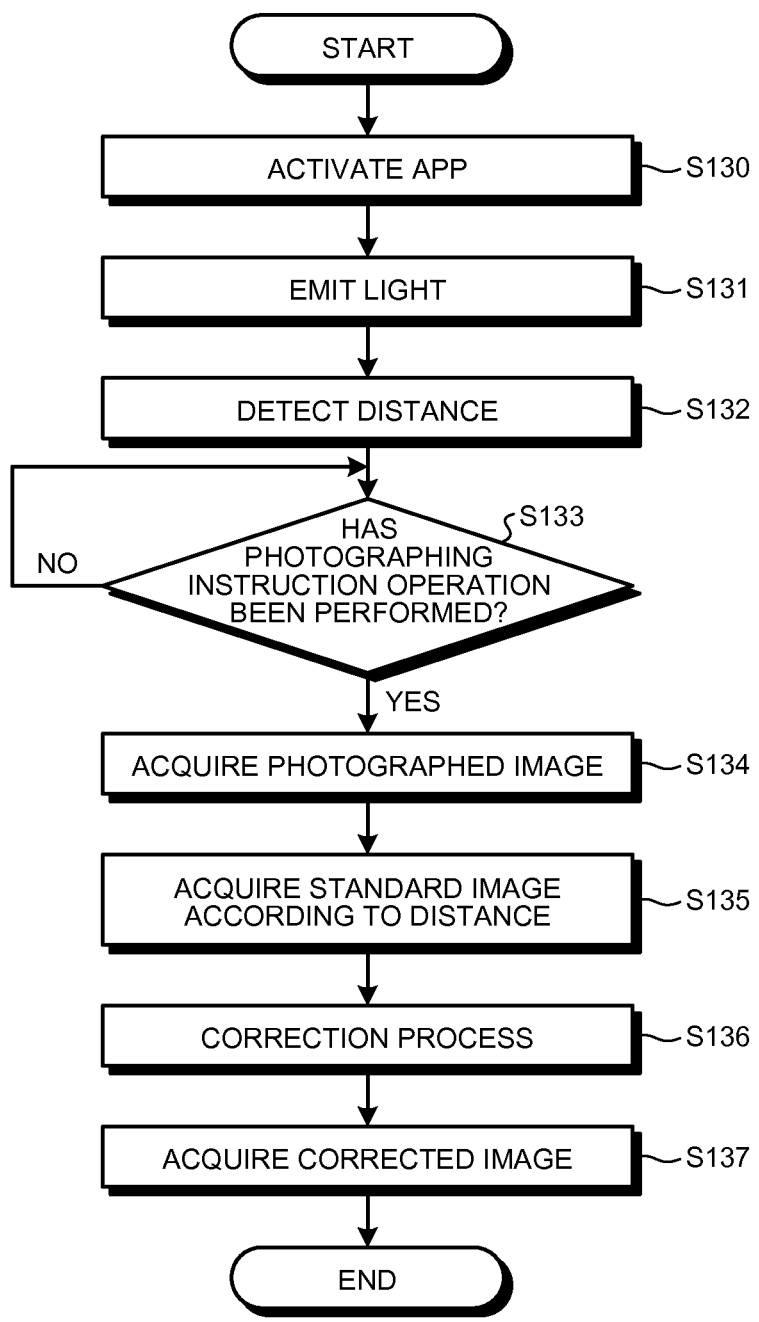
FIG. 17 is an exemplary flowchart illustrating an image correction process according to the second embodiment.

FIG. 17 is an exemplary flowchart illustrating an image correction process according to the second embodiment. For example, when an app according to the second embodiment is activated according to the user's operation on the operating unit 402 in step S130, in step S131, the control unit 430e turns on the light 403 to emit light. In step S132, the control unit 430e detects the distance to the subject (the sheet 330) based on the output of the distance sensor 470.

In step S133, the control unit 430e is on standby for a capturing instruction. For example, when the capturing instruction operation is determined to have been performed on the operating unit 402, the control unit 430e causes the process to proceed to step S134. On the other hand, when no capturing instruction operation is determined to have been performed on the operating unit 402, the control unit 430e causes the process to return to step S133.

In step S134, the control unit 430e reads the captured image data of one frame from the frame memory 442, causes the captured image data of one frame to be stored in the frame memory 445, and acquires the captured image data of the processing target. In step S135, the control unit 430e controls the selector 482 according to the distance detected in step S132 such that the standard image data corresponding to the distance is selected among the standard image data 481a to 481d. Then, the control unit 430e controls the operation unit 447 such that the standard image data selected and output by the selector 482 is input from the standard image output unit 480 to the operation unit 447.

In step S136, the operation unit 447 corrects the captured image data stored in the frame memory 445 in step S134 according to Formulas (1) to (3) using the standard image data input step S135. The operation unit 447 acquires the corrected image data that is corrected by the correction process (step S137). The operation unit 447 outputs the acquired corrected image data to an image extracting unit (not illustrated).

Specific Exemplary Configuration of Information Processing Device

Figure 18:
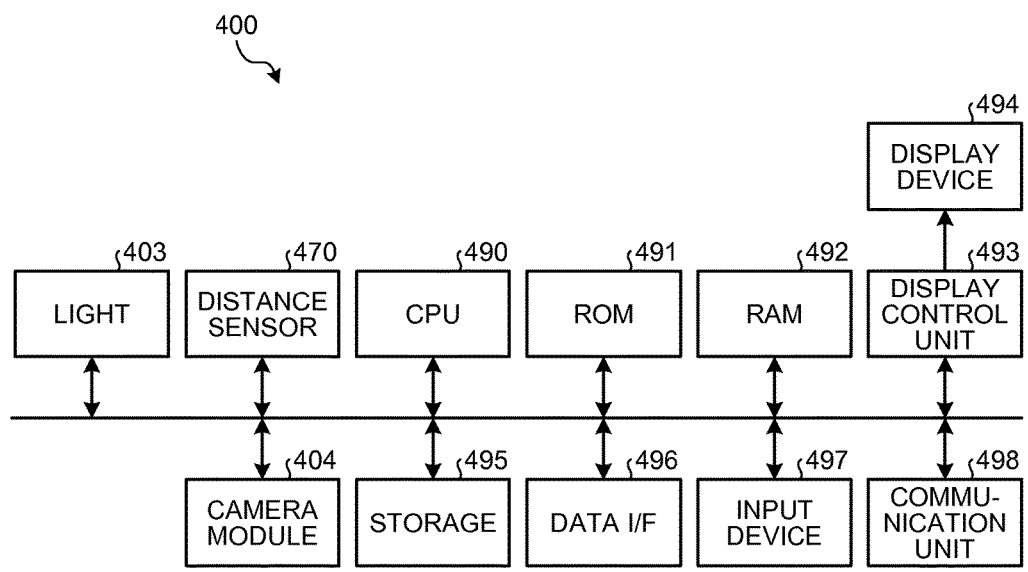
FIG. 18 is a block diagram illustrating an exemplary configuration of an information processing device that can be applied to the embodiments and the modified examples.

FIG. 18 is an exemplary configuration of an information processing device that can be applied to the above embodiments and the above modified examples. FIG. 18 illustrates an exemplary configuration capable of implementing the information processing device 400 described above with reference to FIG. 2, but the configuration of FIG. 18 can be also applied to the information processing devices 400a to 400e according to the modified examples of the first embodiment and the second embodiment.

In the information processing device 400 illustrated in FIG. 18, a CPU 490, a ROM 491, a RAM 492, and a display control unit 493 are connected to a bus. A storage 495, a data I/F 496, an input device 497, and a communication unit 498 are also connected to the bus. For example, the storage 495 is a non-volatile semiconductor memory such as a flash memory serving as a storage medium capable of storing data in a non-volatile manner. The present invention is not limited to this example, and a hard disk drive may be used as the storage 495.

In the information processing device 400, a light 403, a distance sensor 470, and a camera module 404 are further connected to the bus. The light 403 and the distance sensor 470 are connected to the bus via an interface (not illustrated). The present invention is not limited to this example, and the light 403 and the distance sensor 470 may be connected directly to the CPU 490 via an interface (not illustrated).

The CPU 490 controls an operation of the information processing device 400 in general using the RAM 492 as a work memory according to a program stored in the ROM 491 and the storage 495. The display control unit 493 converts a display control signal generated by the CPU 490 into a signal that can be displayed by a display device 494, and outputs the converted signal.

The storage 495 stores a program executed by the CPU 490 and various kinds of data. The data i/F 496 receives data from the outside. For example, an interface according to a Universal Serial Bus (USB), institute of Electrical and Electronics Engineers 1394 (IEEE1394), or the like may be applied as the data i/F 496.

The input device 497 receives a user input, and outputs a certain control signal. For example, when the user operates the input device 497 in response to the display performed by the display device 494, an instruction may be output to the information processing device 400. Further, preferably, the input device 497 is configured integrally with the display device 494 as a touch panel that outputs a control signal according to the position at which the input device 497 is pushed and transmits an image of the display device 494.

The communication unit 498 performs wireless or wired communication with a network using a certain protocol. The camera module 404 performs a capturing function, a zoom function, and the like according to an instruction given by the user's operation on the input device 497. The captured image data obtained by the photography performed by the camera module 404 is transferred to the CPU 490 via the bus.

The control unit 410, the correction processing unit 411, and the standard image output unit 412 are implemented by an application program (app) operating on the CPU 490. The application program may be stored in the ROM 491 or the storage 495 in advance and supplied. The present invention is not limited to this example, and the application program is configured to be stored on a computer connected to a network communicable with the communication unit 498 and supplied by downloading via the network. Further, the application program may be configured to supplied or distribute via a network.

The present invention is not limited to this example, and the application program may be recorded in a computer readable recording medium such as a Compact Disk (CD) or a Digital Versatile Disk (DVD) as a file of an installable format or an executable format and provided. In this case, for example, the application program is supplied to the information processing device 400 through an external drive device or an external computer connected to the data I/F 496.

For example, the application program has a module configuration including the above-described respective units (the control unit 410, the correction processing unit 411, and the standard image output unit 412), and as actual hardware, for example, as the CPU 490 reads the application program from the storage 495, and executes the application program, the respective units are loaded onto a main storage device (for example, the RAM 492), and the respective units are generated on the main storage device.

Third Embodiment

Next, a third embodiment will be described. The third embodiment is an example in which the information processing device 400 according to the first embodiment is applied to a display system that displays image data based on an image drawn by the user as if a fish were swimming in a virtual water tank.

The third embodiment is not limited to the example in which the information processing device 400 according to the first embodiment is applied to the display system, and any one of the information processing devices 400a to 400d according to the first embodiment and the modified examples of the first embodiment and the information processing device 400e according to the second embodiment may be applied.

Figure 19:
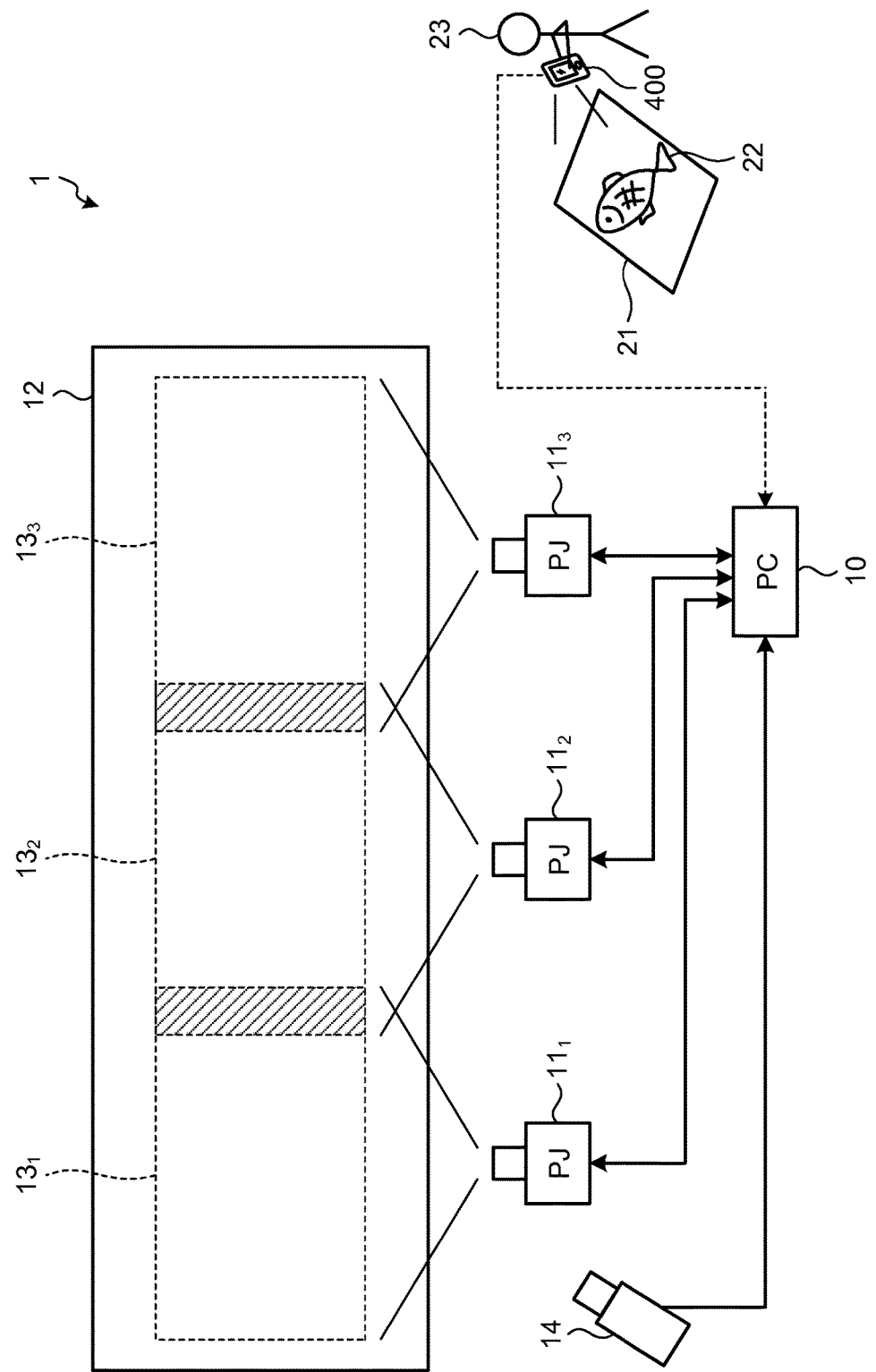
FIG. 19 is a block diagram illustrating an exemplary configuration of a display system according to a third embodiment.

FIG. 19 is a block diagram illustrating an exemplary configuration of a display system according to the third embodiment. Referring to FIG. 19, the display system 1 includes a personal computer (PC) 10, and one or more projector devices (PJ) $11_1$, $11_2$, and $11_3$. The PC 10 can perform wireless or wired data communication with the information processing device 400.

Referring to FIG. 19, a user 23 activates, for example, the app according to the first embodiment in the information processing device 400, and captures a sheet 21 on which a user image 22 is drawn. For example, the information processing device 400 turns on the light 403 to emit light when the app is activated according to the flowchart of FIG.

3 (step S100 and step S101), and acquires captured image data and standard image data according to the user 23's capturing instruction on the information processing device 400 (step S102 to step S104). Then, the information processing device 400 corrects the captured image data according to Formulas (1) to (3) using the standard image data, and acquires image data obtained by correcting the captured image data (step S105 and step S106).

The information processing device 400 transmits the image data obtained by correcting the captured image data to the PC 10. The PC 10 performs certain image processing on the image data transmitted from the information processing device 400, and supplies resultant data to the projector devices (PJs) $11_1$, $11_2$, and $11_3$ as display image data. The projector devices $11_1$, $11_2$, and $11_3$ project images $13_1$, $13_2$, and $13_3$ onto a screen 12 according to the display image data supplied from the PC 10.

Further, when the images $13_1$, $13_2$, and $13_3$ are projected onto the single screen 12 through a plurality of projector devices (PJs) $11_1$, $11_2$, and $11_3$ as illustrated in FIG. 19, an overlapping portion is preferably formed in adjacent portions of the images $13_1$, $13_2$, and $13_3$. In the example of FIG. 19, the images $13_1$, $13_2$, and $13_3$ projected onto the screen 12 are captured by a camera 14, and the PC 10 controls the images $13_1$, $13_2$, and $13_3$ or the projector devices (PJs) $11_1$, $11_2$, and $11_3$ based on the captured image data such that an image of the overlapping portion is adjusted.

In this configuration, for example, the user 23 drawing the user image 22 on the sheet 21 by hand, and the image of the sheet 21 is captured by the information processing device 400. The information processing device 400 corrects the captured image data using the standard image data as described above, and transmits the corrected image data to the PC 10. The PC 10 decides pixels corresponding to the user image 22 from the image data supplied from the information processing device 400, and extracts data of the region of the user image 22. At this time, in the image data supplied from the information processing device 400, a brightness distribution of a portion other than a drawn portion becomes uniform through the correction process, and thus the region of the user image 22 can be extracted. The PC 10 stores image data of the extracted region of the user image 22 as the user image data.

On the other hand, the PC 10 generates an image data space having a three-dimensional (3D) coordinate system. Further, the PC 10 allocates coordinates in the image data space to the user image data, and converts the user image data into data in the image data space. Hereinafter, the user image data in the 3D image data space is referred to as a "user object." The PC 10 projects the 3D image data space including the user object onto a two-dimensional (2D) image data plane, divides the image data generated by the projecting into the number of projector devices (PJs) $11_1$, $11_2$, and $11_3$, and supplies the divided image data to each of the projector devices (PJs) $11_1$, $11_2$, and $11_3$.

Here, the PC 10 can give a motion in the image data space to the user object. For example, the PC 10 obtains a feature quantity of the user image data serving as a source of the user object, and generates each parameter related to a motion including a deformation mode of the user object based on the obtained feature quantity. The PC 10 applies the parameter to the user image data, and gives the motion in the image data space to the user object.

Thus, the user 23 can observe the user image 22 generated by his/her hand as an image moving in the 3D image data space. Further, the PC 10 can cause a plurality of user objects to be included in the same image data space. Thus, the user 23 can observe, for example, each of a plurality of different user images 22 as an image moving in the 3D image data space by repeating the above operation.

Figure 20:
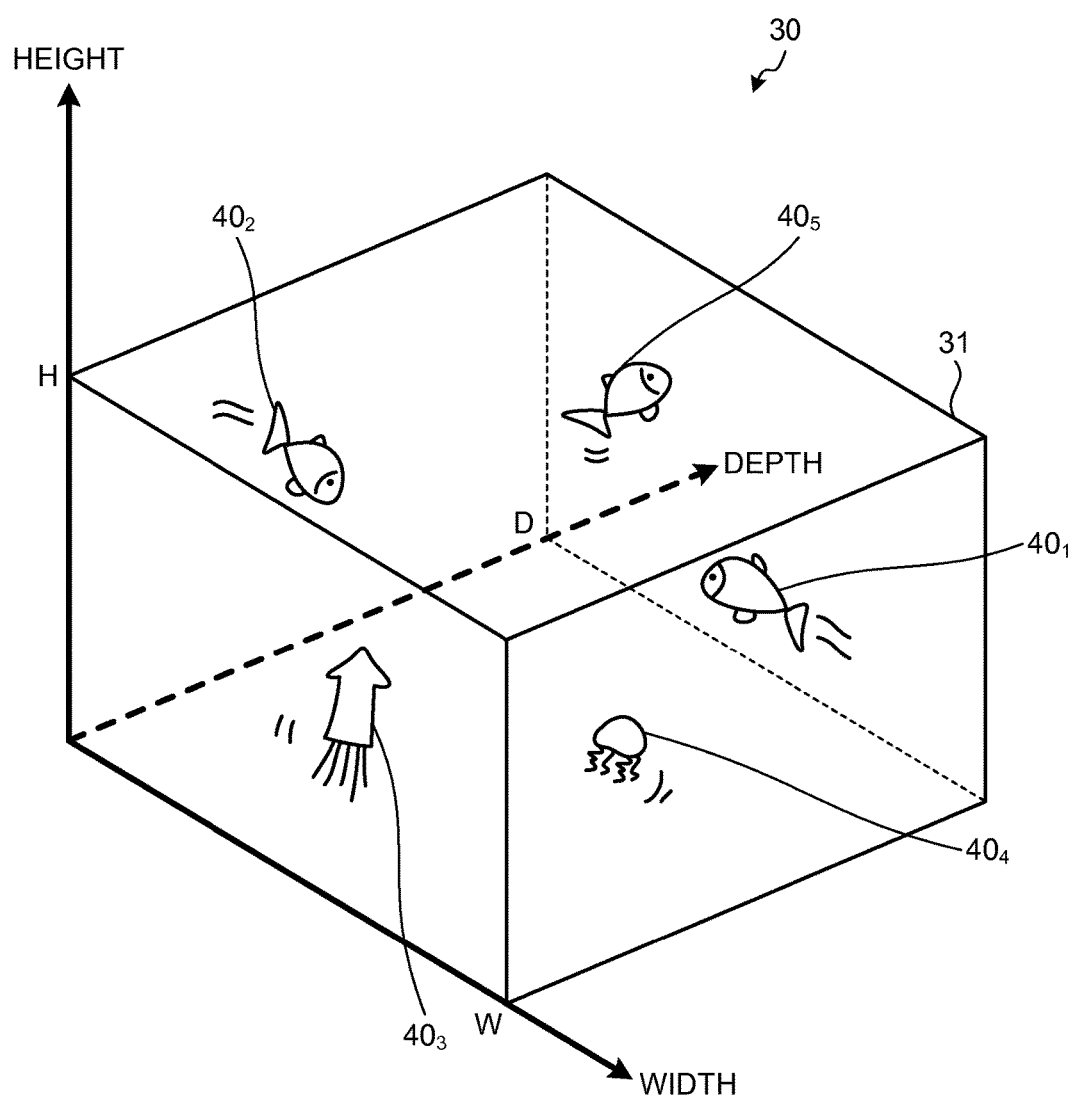
FIG. 20 is a diagram schematically illustrating an image data space having a 3D coordinate system according to the third embodiment.

FIG. 20 schematically illustrates an image data space having a 3D coordinate system generated by the PC 10 according to the third embodiment. In the third embodiment, an orthogonal coordinate system having three coordinate axes (an x axis, a y axis, and a z axis) orthogonal to one another is used as the 3D coordinate system. In the following description, as illustrated in FIG. 20, the x axis, the y axis, and the z axis are assumed to be an axis in a height direction, an axis in a width direction, and an axis in a depth direction, and the PC 10 is assumed to generate an image data space 30 having a 3D coordinate system based on the axes of the height, the width, and the depth. In the example of FIG. 20, user objects $40_1$, $40_2$, $40_3$, $40_4$, and $40_5$ based on the user image data are included in the image data space 30.

The PC 10 sets a definition region 31 serving as a space including a height H, a width W, and a depth D of predetermined values to the image data space 30. A motion of each of the user objects $40_1$, $40_2$, . . . based on the user image data is restricted within the definition region 31. In the third embodiment, a living thing living in the water such as a fish, a squid, an octopus, or a jellyfish can be assumed as the user image 22 serving as a source of each of the user objects $40_1$, $40_2$, . . . , and the definition region 31 can be regarded as a virtual water tank. Hereinafter, the definition region 31 is referred to as a virtual water tank 31 unless specially set forth.

Figure 21:
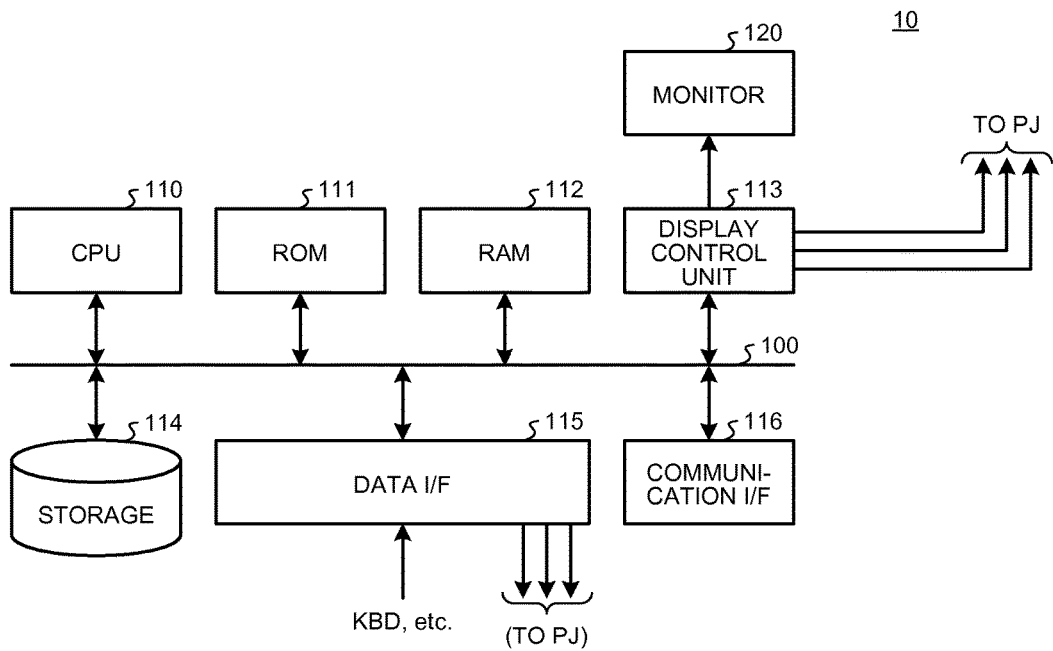
FIG. 21 is a block diagram illustrating an exemplary configuration of a PC according to the third embodiment.

FIG. 21 illustrates an exemplary configuration of the PC 10 according to the third embodiment. In the PC 10 of FIG. 21, a CPU 110, a ROM 111, a RAM 112, and a display control unit 113 are connected to a bus 100. In the PC 10, a storage 114, a data I/F 115, and a communication I/F 116 are further connected to the bus 100.

The CPU 110 controls the PC 10 in general according to a program previously stored in the ROM 111 and the storage 114 using the RAM 112 as a work memory. The display control unit 113 is connected with a monitor 120, and converts a display control signal generated by the CPU 110 into a signal that can be displayed by the monitor 120, and outputs the converted signal. Further, the display control unit 113 can convert the display control signal into a signal that can be displayed by the projector devices $11_1$, $11_2$, and $11_3$ and output the converted signal.

The storage 114 is a storage medium capable of storing data in a non-volatile manner, and, for example, a hard disk drive may be used. The present invention is not limited to this example, and a non-volatile semiconductor memory such as a flash memory may be used as the storage 114. The storage 114 stores a program executed by the CPU 110 and various kinds of data.

The data I/F 115 controls a data input and output with an external device. For example, the data I/F 115 receives a signal from a pointing device such as a mouse or a keyboard (KBD) (not illustrated). Further, for example, the display control signal generated by the CPU 110 may be output from the data I/F 115 and supplied to the projector devices $11_1$, $11_2$, and $11_3$. An interface such as a USB or a Bluetooth (a registered trademark) may be applied as the data I/F 115.

The communication I/F 116 controls communication performed via a network such as the Internet or a Local Area Network (LAN). The PC 10 performs communication with the information processing device 400 through the communication I/F 116.

Figure 22:
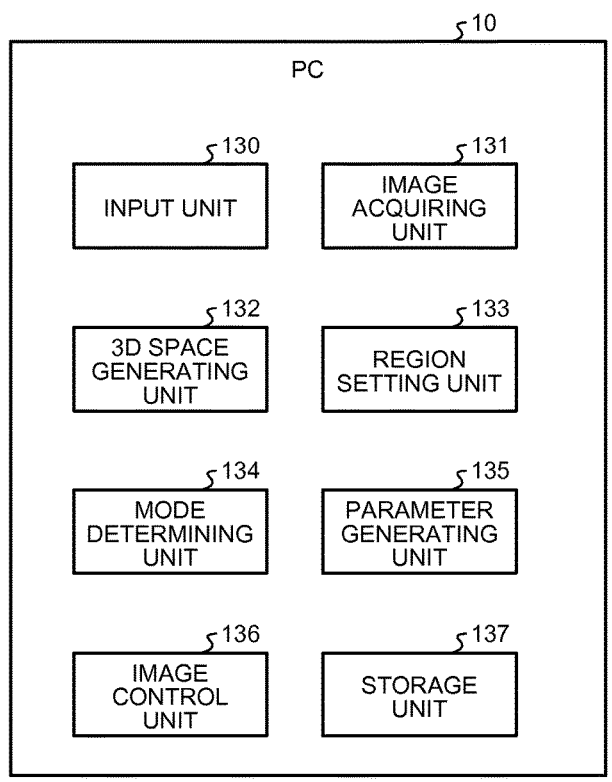
FIG. 22 is an exemplary functional block diagram for describing a function of the PC according to the third embodiment.

FIG. 22 is an exemplary functional block diagram for describing a function of the PC 10 according to the third embodiment. The PC 10 includes an input unit 130, an image acquiring unit 131, a 3D space generating unit 132, a region setting unit 133, a mode determining unit 134, a parameter generating unit 135, an image control unit 136, and a storage unit 137.

The input unit 130 receives the image data including the user image 22 drawn by hand by the user 23. For example, the input unit 130 includes the function of the communication I/F 116, and receives the image data that is obtained by capturing the sheet 21 including the user image 22 drawn by hand by the user 23 and correcting using the standard image and transmitted from the information processing device 400. Further, the input unit 130 extracts the user image 22 from the input image data and acquires the extracted user image as the user image data.

The 3D space generating unit 132 generates the image data space 30 based on 3D coordinate axes including three axes of the height, the width, and the depth described above with reference to FIG. 20. For example, the 3D space generating unit 132 generates the image data space 30 as an address space on the RAM 112. The region setting unit 133 sets the definition region 31 (the virtual water tank 31) of the height H, the width W, and the depth D according to predetermined values to the image data space 30 generated by the 3D space generating unit 132.

The image acquiring unit 131 sets a certain point of view to the image data space 30, projects the image data space 30 onto the 2D image data plane from the set point of view, and acquires image data to be projected by the projector devices $11_1$ to $11_3$.

The mode determining unit 134 determines a deformation mode of the user object (referred to as a "deformation mode") that is allocated to the user object when the user image data is included in the image data space 30 based on the user image data acquired by the input unit 130. The parameter generating unit 135 generates a parameter deciding the performance related to the motion of the user object according to the user image data based on the user image data acquired by the input unit 130.

The image control unit 136 controls the motion of the user object in the image data space 30 according to the deformation mode determined by the mode determining unit 134 and the parameter generated by the parameter generating unit 135. In other words, the image control unit 136 allocates coordinates in the virtual water tank 31 in the image data space 30 to the user object, and performs control such that the coordinates are continuously changed with the passage of time.

The storage unit 137 corresponds to the RAM 112, and stores, for example, the user image data serving as a source of the user object. The present invention is not limited to this example, and the storage 114 may be used as the storage unit 137. For example, the mode determining unit 134 and the parameter generating unit 135 determines the deformation mode and generates the parameter using the user image data stored in the storage unit 137. Further, the image control unit 136 can cause the user image data to be included as the user object in the image data space 30 by allocating the coordinates in the virtual water tank 31 to the user image data stored in the storage unit 137. Furthermore, the image control unit 136 performs, for example, a deformation process or a movement process on the user object according to the deformation mode or the parameter.

The input unit 130, the image acquiring unit 131, the 3D space generating unit 132, the region setting unit 133, the mode determining unit 134, the parameter generating unit 135, and the image control unit 136 included in the PC 10 are implemented by a display control program that is stored in, for example, the storage 114 and operates on the CPU 110. The display control program is recorded in a computer readable recording medium such as a CD, a Flexible Disk (FD), or a DVD as a file of an installable format or an executable format and provided.

Further, the display control program executed by the PC 10 according to an embodiment may be configured to be stored on a computer connected to a network such as the Internet and supplied by downloading via the network. Furthermore, the display control program executed by the PC 10 according to an embodiment may be configured to supplied or distribute via a network such as the Internet. Moreover, the display control program executed by the PC 10 according to an embodiment may be configured to be embedded in the ROM 111 or the like and provided.

The display control program executed by the PC 10 according to an embodiment has a module configuration including the above-described respective units (the input unit 130, the image acquiring unit 131, the 3D space generating unit 132, the region setting unit 133, the mode determining unit 134, the parameter generating unit 135, and the image control unit 136). As actual hardware, for example, as the CPU 110 reads the display control program from a storage medium such as the storage 114 or the ROM 111, and executes the display control program, the respective units are loaded onto a main storage device such as the RAM 112, and the input unit 130, the image acquiring unit 131, the 3D space generating unit 132, the region setting unit 133, the mode determining unit 134, the parameter generating unit 135, and the image control unit 136 are generated on the main storage device.

Figure 23:
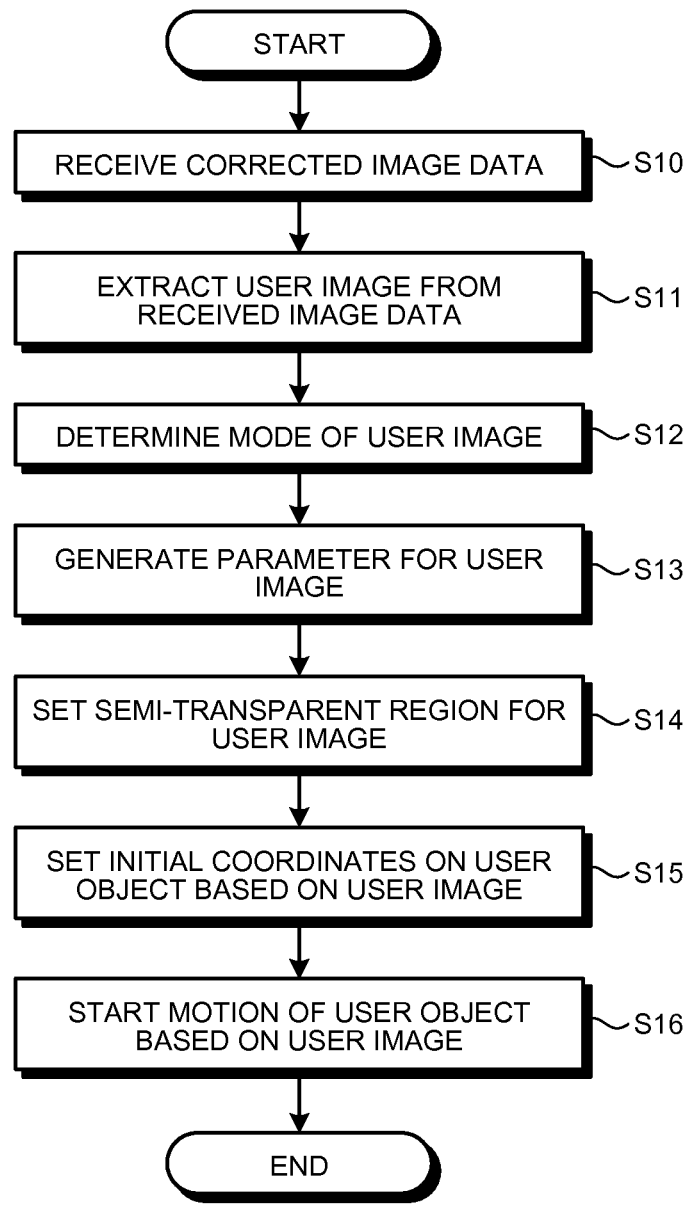
FIG. 23 is an exemplary flowchart illustrating an overall flow of a display control process performed by the display system according to the third embodiment.

Next, a display control process according to an embodiment will be described in further detail. FIG. 23 is an exemplary flowchart illustrating an overall flow of a display control process performed by the display system according to the third embodiment. Before the process according to the flowchart is executed, the user 23 draws the user image 22 on the sheet 21. Here, the user is assumed to draw the user image 22 on a sheet having a predetermined format.

Figure 24:
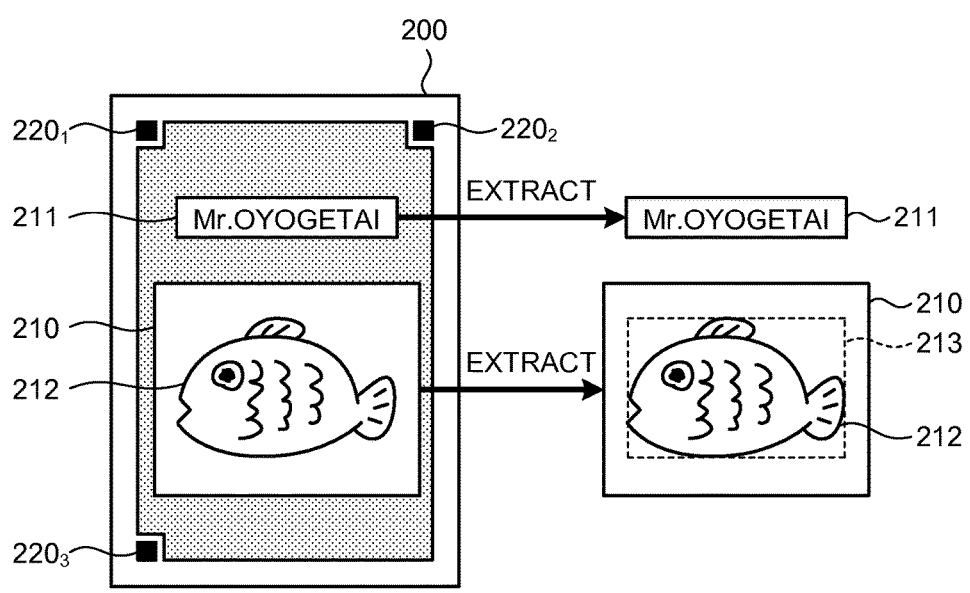
FIG. 24 is a diagram illustrating an exemplary sheet for performing drawing by hand according to the third embodiment.

FIG. 24 illustrates an exemplary sheet for performing drawing by hand according to the third embodiment. In a sheet 200 illustrated on the left side of FIG. 24, a drawing region 210 in which a user image 212 serving as a source of an object (the user object) desired to be included in the image data space 30 is drawn by hand and a title input region 211 in which a title of a picture drawn in the drawing region 210 is input are arranged.

Further, markers $220_1$, $220_2$, and $220_3$ are arranged on three of four corners of the sheet 200. By detecting the markers $220_1$, $220_2$, and $220_3$ from the captured image obtained by capturing the image of the sheet 200 through the information processing device 400, it is possible to understand the direction and size of the sheet 200. The markers $220_1$, $220_2$, and $220_3$ may be arranged on the corners of the drawing region 210.

Referring to the flowchart of FIG. 23, the PC 10 receives the image data that is obtained by capturing the image of the sheet 200 including the user image 212 and then correcting using the standard image and transmitted from the information processing device 400. In step S10, the received image data is input to the input unit 130.

In step S11, in the PC 10, the input unit 130 extracts the user image data from the input image data. First, the input unit 130 detects the markers $220_1$ to $220_3$ from the image data. The input unit 130 determines the direction and size of the image data based on the positions of the detected markers $220_1$ to $220_3$ on the image data.

For example, the input unit 130 detects a corner on which none of the markers $220_1$ to $220_3$ are positioned among the four corners of the image data, and determines the direction of the image data based on the position of the detected corner. In the example of FIG. 24, the corner on which none of the markers $220_1$ to $220_3$ are positioned is determined to be a lower right corner of the image data. Based on this, the positions of the markers $220_1$ to $220_3$ on the original image data can be estimated. The input unit 130 measures the distance between the markers $220_1$ to $220_3$, and compare the measured distance with a known corresponding distance previously stored in the storage 114 or the like. Distortion in the size of the original image data in the horizontal and vertical directions can be corrected Based on the comparison result.

Thus, the input unit 130 extracts the drawing region 210 and the title input region 211 from the image data based on the direction and size of the image data acquired as described above. An exemplary image based on the image data of the drawing region 210 and the title input region 211 extracted from the image data is illustrated on the right side of FIG. 24. The input unit 130 further extracts a portion of the user image 212 from the image data of the drawing region 210. For example, the input unit 130 performs binarization on the image data by performing threshold determination on brightness of each of pixels of the image data of the drawing region 210. The portion of the user image 212 is extracted on the binarized image data. Image data of a minimum rectangular region 213 that includes the portion of the user image 212 and has a direction of the bottom parallel to a direction of the bottom of the drawing region 210 is used as the user image data. The input unit 130 causes the storage unit 137 to store the user image data.

In step S12, in the PC 10, the mode determining unit 134 determines a deformation mode allocated to the user image data extracted in step S11. In an embodiment, the deformation mode is allocated to each user object in the virtual water tank 31, and an operation of each user object in the virtual water tank 31 is controlled based on the deformation mode.

In the third embodiment, three modes, that is, a first mode in which the user object is vertically divided and deformed by moving a rear side in a moving direction, a second mode in which the user object is deformed by expanding and contracting the user object in the vertical direction, and a third mode in which the user object is horizontally divided and deformed by moving a lower side are defined as the deformation mode. In an embodiment, an aspect ratio R of the user image data is acquired, any one of the first, second, and third modes that is allocated to the user object based on the user image data is decided according to the acquired aspect ratio R.

In step S13, in the PC 10, the parameter generating unit 135 generates and decides a parameter p deciding the performance (hereinafter, referred to as "motion performance") related to the motion of the user object in the image data space 30 on the user object based on the user image data. The motion of the user object in the image data space 30 is controlled according to the parameter p that is generated and decided herein. For example, the parameter p includes a maximum speed and acceleration in the moving direction, a maximum value of angular acceleration in the horizontal and vertical directions, a maximum value of a direction change speed in the vertical direction, and a maximum value (a maximum random number width) of a random number width in the horizontal and vertical directions.

The parameter generating unit 135 obtains a feature quantity of the user image 212, and decides each parameter p of the user object based on the user image data based on the obtained feature quantity. The feature quantity of the user image data can be obtained based on a color distribution or an edge quantity in the user image data. Further, the feature quantity can be obtained based on bit information of pixels configuring the user image data as described in Japanese Laid-open Patent Publication No. 2009-101122.

In step S14, the image control unit 136 sets a semi-transparent region to the user image data. For example, the image control unit 136 detects an inside region and an outside region of the portion of the user image 212 extracted by the input unit 130 in the rectangular region 213 including the user image data as described above with reference to FIG. 24. The image control unit 136 sets pixels in the detected inside region to be semi-transparent. Further, the image control unit 136 sets the detected outside region to be transparent. The transparent and semi-transparent setting of the image data can be implemented using a known alpha blending technique.

By setting the semi-transparent region to the portion of the user image 212 of the user image data as described above, the user object based on the user image data in the virtual water tank 31 can look like a living thing in the water.

Then, in step S15, the image control unit 136 sets initial coordinates at which the user object is first displayed in the virtual water tank 31 to the user object based on the user image data. In step S16, the image control unit 136 gives a motion to the user object to which the initial coordinates are set in step S15, and causes the user object to start to move. The image control unit 136 causes the user object to move according to the parameter p while deforming the target user object according to any one of the first to third deformation modes set to the target user object.

According to the present invention, an effect of making it possible to easily extract a drawing region from a captured image obtained by capturing an original is obtained.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal device including a camera, a light source, and a display, the terminal device comprising:
    memory storing computer-readable instructions; and
    one or more processors configured to execute the computer-readable instructions such that the one or more processors are configured to,
        display a finder screen with a mark image on the display,
            the mark image being configured to be used by a user, when a subject that is a sheet is captured with the camera, for adjusting a distance between the camera and the subject so as to become a predetermined distance by moving a captured image of a predetermined frame formed on the subject closer to the mark image, the predetermined frame being for indicating a region in which the user draws a drawing target,
            the subject including a plurality of visual markers located on the subject at positions corresponding to corners of the predetermined frame,
        detect sides of the predetermined frame using the visual markers,
        detect a position of the predetermined frame relative to the mark image by determining one or more distances between one or more of the sides of the predetermined frame and one or more corresponding sides of the mark image,
        control the camera and the light source when capturing the subject to obtain a captured image of the subject based on the detected position of the predetermined frame, the captured image of the subject being generated by a capturing process in a condition where light is emitted from the light source to a capturing area of the subject,
        generate a corrected image by executing an image correction operation on the captured image of the subject,
            the image correction operation being a process to suppress influence of brightness on the captured image of the subject based on a brightness distribution at a time when,
                the light is incident on the subject, and
                a distance of the subject from the camera is set to the predetermined distance, and
        extract a drawing target included in the captured image of the predetermined frame from the corrected image for displaying the drawing target.

2. The terminal device according to claim 1, wherein the mark image is a frame image.

3. The terminal device according to claim 2, wherein the one or more processors are configured to execute the computer-readable instructions such that the one or more processors are configured to generate the corrected image by executing the image correction operation on the captured image of the subject in response to recognizing the predetermined frame in the captured image of the subject.

4. The terminal device according to claim 3, wherein the one or more processors are configured to execute the computer-readable instructions such that the one or more processors are configured to,
    determine whether or not a shape of the recognized predetermined frame satisfies a first shape condition, and
    generate an acquired image by storing the captured image when the shape of the predetermined frame recognized satisfies the first shape condition.

5. The terminal device according to claim 1, wherein the brightness distribution is a brightness distribution of a standard image that is a captured image of a sheet in which the drawing target is not formed.

6. A method for acquiring drawing target with a terminal device, the terminal device including a camera, a light source, a display, a processor, and storage, the method comprising:
    displaying a finder screen with a mark image on the display, the mark image being used by a user, when a subject that is a sheet is captured with the camera, for adjusting a distance between the camera and the subject so as to become a predetermined distance by moving a captured image of a predetermined frame formed on the subject closer to the mark image, the predetermined frame being for indicating a region in which the user draws a drawing target,
        the subject including a plurality of visual markers located on the subject at positions corresponding to corners of the predetermined frame,
    detecting sides of the predetermined frame using the visual markers,
    detecting a position of the predetermined frame relative to the mark image by determining one or more distances between one or more of the sides of the predetermined frame and one or more corresponding sides of the mark image,
    controlling the camera and the light source when capturing the subject to obtain a captured image of the subject based on the detected position of the predetermined frame, the captured image of the subject being generated by a capturing process in a condition where light is emitted from the light source to a capturing area of the subject,
    generating a corrected image by executing an image correction operation on the captured image of the subject,
        the image correction operation being a process to suppress influence of brightness on the captured image of the subject based on a brightness distribution at a time when,
            the light is incident on the subject, and
            a distance of the subject from the camera is set to a predetermined distance, and
    extracting a drawing target included in the captured image of the predetermined frame from the corrected image for displaying the drawing target.

7. The method according to claim 6, wherein the mark image is a frame image.

8. The method according to claim 7, further comprising:
    generating the corrected image by executing the image correction operation on the captured image of the subject in response to recognizing the predetermined frame in the captured image of the subject.

9. The method according to claim 8, further comprising:
determining whether or not a shape of the recognized predetermined frame satisfies a first shape condition; and
generating an acquired image by storing the captured image of the subject when the shape of the predetermined frame recognized satisfies the first shape condition.

10. The method according to claim 6, wherein the brightness distribution is a brightness distribution of a standard image that is a captured image of a sheet in which the drawing target is not formed.

11. A non-transitory computer-readable recording medium storing instructions that, when executed by one or more processors, cause the one or more processors to perform operations for controlling a terminal device, the terminal device including a camera, a light source, a display, a processor, and storage, the operations for controlling the terminal device including:
displaying a finder screen with a mark image on the display, the mark image being configured to be used by a user, when a subject that is a sheet is captured with the camera, for adjusting a distance between the camera and the subject so as to become a predetermined distance by moving a captured image of a predetermined frame formed on the subject closer to the mark image, the predetermined frame being for indicating a region in which the user draws a drawing target,
the subject including a plurality of visual markers located on the subject at positions corresponding to corners of the predetermined frame,
detecting sides of the predetermined frame using the visual markers,
detecting a position of the predetermined frame relative to the mark image by determining one or more distances between one or more of the sides of the predetermined frame and one or more corresponding sides of the mark image,
controlling the camera and the light source when capturing the subject to obtain a captured image of the subject, the captured image of the subject being generated by a capturing process in a condition where light is emitted from the light source to a capturing area of the subject,
generating a corrected image by executing an image correction operation on the captured image of the subject,
the image correction operation being a process to suppress influence of brightness on the captured image of the subject based on a brightness distribution at a time when,
the light is incident on the subject, and
a distance of the subject from the camera is set to a predetermined distance, and
extracting a drawing target included in the captured image of the predetermined frame from the corrected image for displaying the drawing target.

12. The non-transitory computer-readable recording medium according to claim 11, wherein the mark image is a frame image.

13. The non-transitory computer-readable recording medium according to claim 12, wherein the operations for controlling the terminal device further include:
generating an acquired image by storing the captured image of the subject including the frame image in response to recognizing the predetermined frame in the captured image of the subject.

14. The non-transitory computer-readable recording medium according to claim 13, wherein the operations for controlling the terminal device further include:
determining whether or not a shape of the recognized predetermined frame satisfies a first shape condition; and
generating the acquired image by storing the captured image of the subject when the shape of the recognized predetermined frame satisfies the first shape condition.

15. The non-transitory computer-readable recording medium according to claim 11, wherein the brightness distribution is a brightness distribution of a standard image that is a captured image of a sheet in which the drawing target is not formed.

* * * * *